(12) United States Patent  
Nomura et al.

(10) Patent No.: US 7,173,724 B2  
(45) Date of Patent: Feb. 6, 2007

(54) IMAGE FORMING SYSTEM HAVING DISPLAY SECTIONS WITH DIFFERENT FORMATS

(75) Inventors: Tatsuo Nomura, Soraku-gun (JP); Yuhji Okamoto, Soraku-gun (JP); Syoichiro Yoshiura, Ikoma-gun (JP); Kohki Fukuda, Nara (JP); Keiichi Hasegawa, Soraku-gun (JP); Seiji Takeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 884 days.

(21) Appl. No.: 10/035,112

(22) Filed: Dec. 20, 2001

(65) Prior Publication Data

US 2002/0105674 A1 Aug. 8, 2002

(30) Foreign Application Priority Data

| Feb. 2, 2001 | (JP) | ............................ 2001-027511 |
| Mar. 19, 2001 | (JP) | ............................ 2001-078487 |
| Mar. 22, 2001 | (JP) | ............................ 2001-083732 |
| Mar. 29, 2001 | (JP) | ............................ 2001-096529 |

(51) Int. Cl.  
*G06F 3/12* (2006.01)

(52) U.S. Cl. ..................... 358/1.15; 358/400; 358/496

(58) Field of Classification Search ............... 358/1.15, 358/496, 400  
See application file for complete search history.

(56) References Cited

U.S. PATENT DOCUMENTS 4,682,158 A * 7/1987 Ito et al. .................... 340/679
5,956,160 A * 9/1999 Watanabe ................... 358/496
6,191,758 B1 * 2/2001 Lee ........................... 345/2.2
6,618,167 B1 * 9/2003 Shah ......................... 358/1.15

FOREIGN PATENT DOCUMENTS

| JP | 06-253084 | 9/1994 |
| JP | 09-272244 | 10/1997 |
| JP | 11-215283 | 8/1999 |
| JP | 2000-232541 | 8/2000 |
| JP | 2000232541 A * | 8/2000 |

* cited by examiner

*Primary Examiner*—Kimberly Williams  
*Assistant Examiner*—Andrew Lam  
(74) *Attorney, Agent, or Firm*—George W. Neuner; David G. Conlin; Edwards Angell Palmer & Dodge LLP

(57) ABSTRACT

A display section of a scanner is connected to a printer controller of a printer via a bus line, so that detailed information regarding the scanner the printer and so on is controlled by the printer controller. Both display contents respectively regarding the printer or the scanner are stored in a VRAM of the printer controller. Because of this, the detailed information regarding the printer is displayed on the display section of the scanner, which is a large LCD. This provides an image forming system, which notifies a user of the detailed information of the printer in a such manner that the user can easily understand the detailed information, when the scanner and the printer, each of which can be used independently, are combined as a system.

22 Claims, 32 Drawing Sheets

FIG. 7

| | USER/MODE | RECEIPT DATE | NUMBER OF SHEETS | STATUS |
|---|---|---|---|---|
| 1 | OKAMOTO | 14:15 12/09 | 007/015 | IN PROCESS |
| 2 | MATUMOTO | 14:17 12/09 | 000/007 | WAITING |
| 3 | 0743XXXXXX | 14:18 12/09 | 000/003 | WAITING |

JOB KEY COMPLETE  1/2

PRINT JOB | E-MAIL JOB | FAX JOB | A J ALL JOBS | INTERCEPTION

AVAILABLE FOR PRINTING

JAM IN MAIN BODY.
REMOVE BOTH-SIDE CONVEYING UNIT.

NO SHEETS IN LAGER CAPACITY TRAY.
SUPPLY SHEETS.

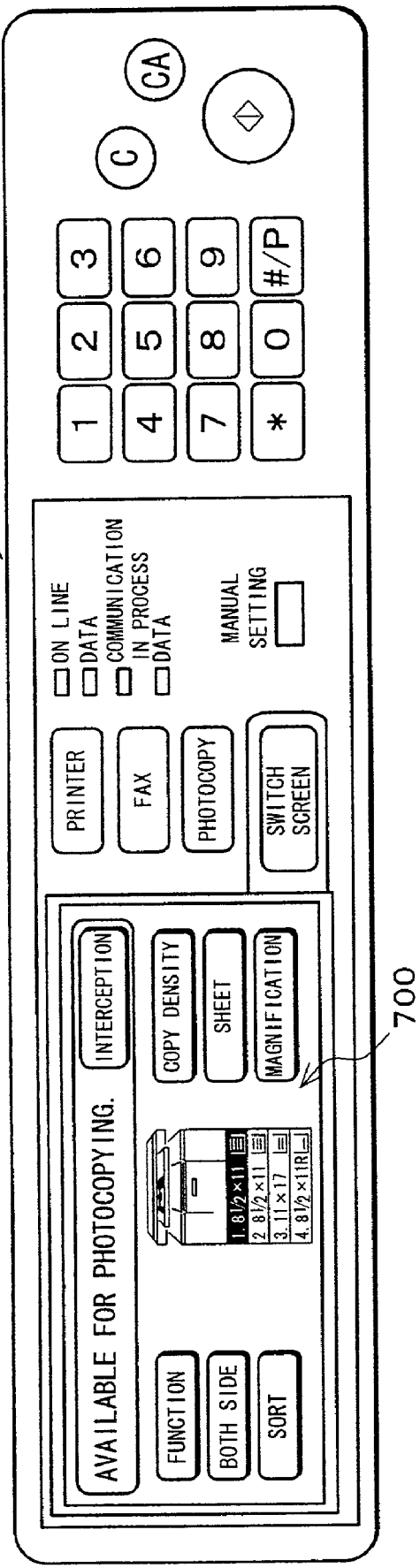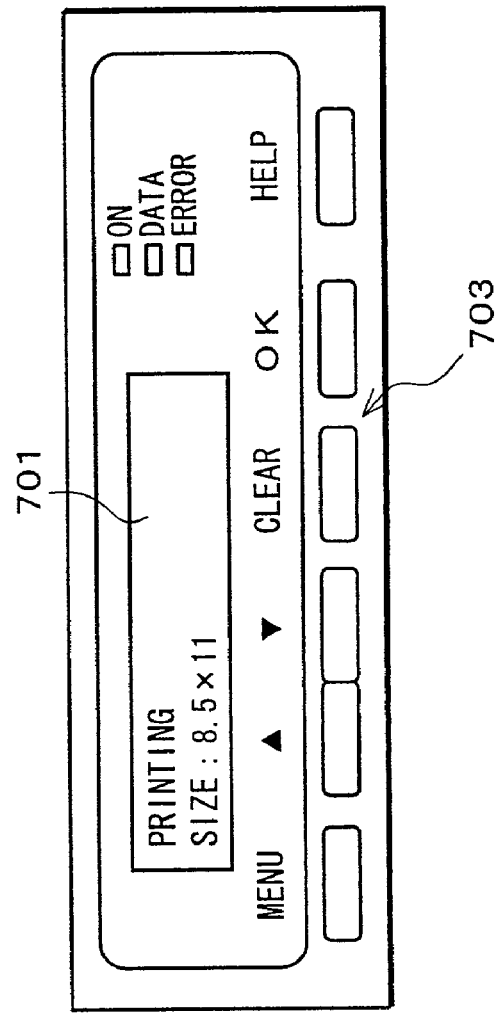
FIG. 20 (a)
FIG. 20 (b)

IMAGE FORMING SYSTEM HAVING DISPLAY SECTIONS WITH DIFFERENT FORMATS

FIELD OF THE INVENTION

The present invention relates to an image forming system provided, in combination, with (a) a scanner for optically reading a document image and (b) a printer for forming an image on a recording medium, where the scanner and the printer are respectively capable of being used individually (independently, in a non-systematic manner). Especially, the present invention relates to an image forming system provided with such scanner and printer, respectively having an information display section for displaying information regarding image processing.

BACKGROUND OF THE INVENTION

Conventionally, in case a scanner and a printer, which can be used individually, are used in combination as a system, condition of the scanner and the printer is displayed to a user in the following manner.

Information of the scanner is displayed on a large-sized liquid crystal display apparatus (hereinafter, just referred to as an LCD), which is provided as a display section of an operation panel of the scanner. On the other hand, information of the printer (such as a message regarding an error) is generally displayed on a display section 1502 of an operation panel 1501 that is provided on a printer main body. FIG. 32 shows an example of such operation panel. The operation panel 1501 is provided with the display section 1502, which is a small-sized LCD, and an operation section 1503, which is composed of various keys 1503a to 1503f.

However, as shown in FIG. 32, the display section 1502 of the printer main body can display only a limited amount of information, because the display section 1502 is the small-sized LCD that can display only two lines or so.

Hence, the information of the printer is conventionally displayed on the display section, which is the small-sized LCD, where the scanner and the printer are used in combination as a system. Thus, in order to be displayed on such display section, every information of the printer should be as short as two lines. In case of information requiring more than two lines to be fully displayed, scrolling a display thereof by using an up-key and a down-key is necessary to show the display to the user.

Therefore, for example, if the printer is in trouble, such as jamming, available to the user is instructions displayed on the small-sized display section. Because such instructions are hard to follow, it is difficult to deal with the trouble, following the instructions.

Japanese Unexamined Patent Publication, Tokukaihei No. 6-253084 (published on Sep. 9, 1994), discloses a prior art that improves economy of a composite function terminal device having multi functions, such as a printer function, a photocopying function, and a fax function. In order to extend functions of the device, the prior art controls an operation panel built in a standard composite function terminal device, and an operation panel, which is extended display means that can be added or removed from the composite function terminal device, so that both the operation panels are operated in a linked manner.

Moreover, there is a prior art in which a scanner and a printer are integrated to form a unit. Each of the scanner and printer of the prior art cannot be individually used, and detailed information of the printer need to be displayed on a large-sized LCD of the scanner.

However, those prior arts are to be used in the composite machine in which each function is integrated therein, and cannot be employed in the system in which the scanner and the printer, each of which can be individually used, are combined, like the present application.

Furthermore, Japanese Unexamined Patent Publication, Tokukaihei, No. 8-297388 (published on Nov. 12, 1996) discloses an image forming apparatus in which a scanner unit and a printer unit, each of which can be individually used, are combined. The image forming apparatus displays, on a display input apparatus (operation panel) of the scanner unit, information regarding an error or a state of the printer unit.

However, in the image forming apparatus of the publications, displayed on the display input apparatus of the scanner unit is merely information of the condition of the apparatus as a whole, for example, the information of the error or the state of the apparatus, so that the user can grasp the condition of the apparatus as a whole. Therefore, no detailed information of the printer unit, such as the instruction of solving jamming, feeding sheets (paper), or exchanging units, cannot be displayed in a user-friendly form.

Moreover, as to an image forming system in which a scanner and a printer are separately provided so that the scanner and the printer are respectively located in a predetermined position, both the scanner and the printer are generally provided with a user interface section, which includes a display section for displaying various information, and an operation section for giving instructions on operation. Between the two user interface sections, the user mainly operates the interface section that is easier to see and use for him.

Generally in the image forming apparatus in which the scanner and the printer are combined, the user interface section of the scanner is located on such a position (upper position) that the user can easily operate the user interface section, considering that a document is set or exchanged on the image forming apparatus.

However, in case of a usual operation where the user operates the image forming system referring to the information displayed on the display section of the scanner, the user should squat down so as to see and confirm the display section of the printer, which locates underneath the display section of the scanner and cannot be seen without squatting down. Moreover, in the image forming system, display information displayed respectively on the display section of the scanner and that of the printer is shown to the user, when he refers to the operation instructions or confirms the state of the image forming system.

Therefore, a user is, who is unfamiliar with the image forming system, confused. Thus, the user interface section is not user-friendly.

Especially, in case the display section of the scanner and that of the printer have different display capacities, the information displayed on each display section is displayed in a different manner, thereby confusing the user more. Further, while in the image forming system each of the scanner and the printer are individually operated so as to perform different tasks at the same time, it is impossible to operate only the printer without special operational setting by a specific manager, such as a service personnel, when the scanner is detached from the printer, for example, for periodical maintenance or repair of the scanner.

Furthermore, in case a scanner is newly added to the image forming system composed of the printer only, it is impossible to operate the printer and the scanner in combination without a special operational setting by the specific manager such as a service personnel, similarly to the above case.

SUMMARY OF THE INVENTION

A first object of the present invention is to offer an image forming system capable of giving a user detailed information of a printer in such a manner that the user can easily understand the detailed information, where the scanner and a printer, each of which can be used independently (that is, in a non-systematic manner), are used in combination as a system (that is, in a systematic manner).

A second object of the present invention is to offer an image forming system, in which a user-friendly user interface can be easily realized, in case a plurality of image processing units (that is, the scanner and the printer) are connected with each other via an interface.

In order to attain the above objects, a first image forming system of the present invention, including a printer for forming an image on a recording medium and a scanner for optically reading a document image, where the printer and the scanner are used in a systematic manner in which the printer and the scanner are used in combination as a system, wherein the printer and the scanner respectively comprises a display section, in such a manner that at least one of the display sections is so controlled to have different display formats for a non-systematic manner and for the systematic manner.

Moreover, in the image forming system, one of the display sections of the printer and the scanner shows information regarding the whole system, when the printer and the scanner are used in combination as the system.

Conventionally, the detailed information, for example, instructions how to solve jamming, instructions how to exchange an exchangeable unit, or instructions how to supply sheets, is displayed on the display section of the printer when the printer and the scanner, each of which can be used in the non-systematic manner, are combined together to form a system. However, the printer is generally provided with a display section, which is generally so small that only about two lines of characters can be displayed thereon.

Therefore, with the above arrangement, where the information regarding the printer is displayed on the display section, which is generally large in size, it is possible to increase an amount of information. Moreover, it is also possible to show a drawing on the large-sized display section. Therefore, it is possible to display, with a drawing, complicated information, such as the instructions how to solve jamming in printer, which is hardly understandable when only explanation in characters is provided. This makes it easier for the user to understand the complicated information, such as the instructions how to solve jamming.

As discussed above, with the arrangement of the present invention, the large-sized display section of the scanner is so sufficiently used that the system is more easily operated, thereby providing a more user-friendly image forming system.

In order to attain the above objects, in a second image forming system of the present invention, including a printer for forming an image on a recording medium and a scanner for optically reading a document image, where the printer and the scanner are used in a systematic manner in which the printer and the scanner are used in combination as a system, wherein the printer and the scanner respectively include a user interface section composed of the display section and an operation section therein, the image forming system further includes (a) a detecting section for detecting connection of the printer and the scanner when the printer and the scanner are connected together as the system, or disconnection of the printer and the scanner when the printer and the scanner are disconnected from each other, and (b) a control section for inactivating one of the user interfaces section of the printer and the scanner when the detection section detects the connection of the printer and the scanner.

In the image forming system, only the user interface section of one of the printer and the scanner (for example, the user interface section of the scanner) is activated, when the printer and the scanner are connected with each other. In this manner, the information is not displayed in various display formats on more than one of the display sections. Therefore, this provides a user-friendly system, which does not confuse the user.

For a fuller understanding of the nature and advantages of the invention, reference should be made to the ensuing detailed description taken in conjunction with the accompanying drawings.

BRIEF DESCRIPTION OF THE DRAWINGS

FIG. 7 is an explanatory view showing a job status picture plane displayed on the large-sized LCD.

FIG. 10 is an explanatory view showing a standby picture plane displayed on the small-sized LCD.

FIG. 12 is an explanatory view showing display of instructions how to solve jamming, which is displayed on the small-sized LCD.

FIG. 14 is an explanatory view showing display displayed on the small-sized LCD, when sheets are to be replenished.

FIGS. 20(*a*) and 20(*b*) are plan views illustrating by way of example information display sections of the image forming system. FIG. 20(*a*) shows a scanner display section, which is provided to a scanner operating section. Illustrated in FIG. 20(*b*) is a printer display section, which is provided to a printer operation section.

FIG. 23(*a*) shows a display format of a case where the printer is normally operated, while FIG. 23(*b*) illustrates a display format of a case where "paper is jammed" in the printer, and FIG. 23(*c*) shows a display format of the printer is "out of paper".

FIG. 24(*a*) shows a case where the printer has no job to process. FIG. 24(*b*) shows a case where the printer is processing an image data, for example from a personal computer. FIG. 24(*c*) illustrates a case where the printer is processing an image data received by fax.

FIG. 25(*a*) shows a case where the two controllers respectively control different operation sections, while FIG. 25(*b*) illustrates a case where the two controllers share one operation section.

DESCRIPTION OF THE EMBODIMENTS

[First Embodiment]

Described below is a first embodiment of the present invention, with reference to figures.

Figure 2:
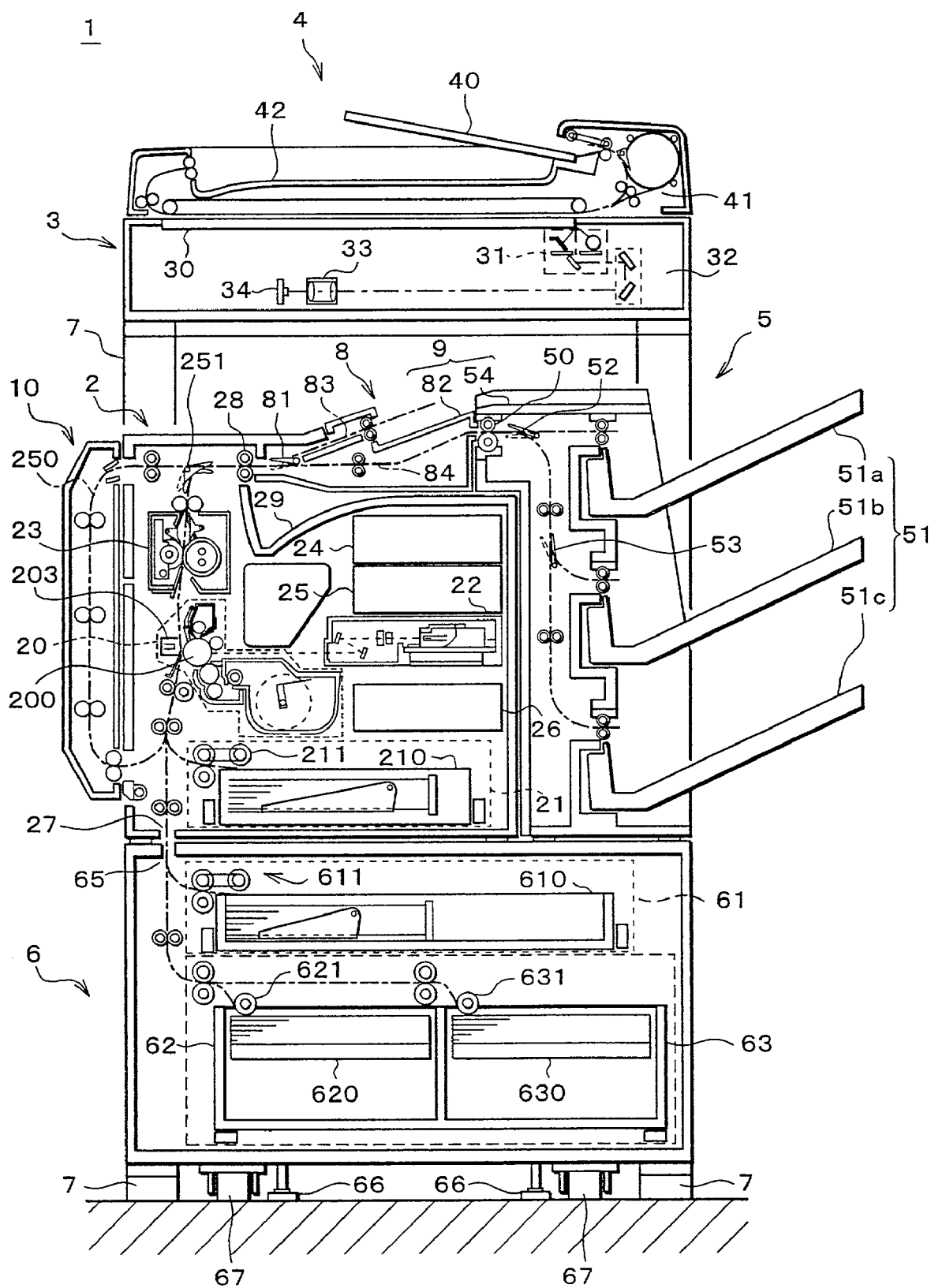
FIG. 2 is a schematic sectional view showing the image forming system.

FIG. 2 is a vertical sectional view of an image forming system 1 of the first embodiment of the present invention. The image forming system 1 is provided with a printer 2, which is a core part of the image forming system, and is further provided with a scanner 3, an automatic document feeder 4, a sheet post-treatment apparatus 5, a multi-staged sheet feeding unit 6, a relaying unit 8 and a both-side conveying unit 10, in order to have extended functions. The scanner 3, as well as the automatic document feeder 4 placed on a top of the scanner 3, is supported by system racks 7, so as to have a location above the printer 2 and the sheet post-treatment apparatus 5.

In addition, each of the printer 2 and the scanner 3 can be used individually, or can be used in combination with other devices, forming a system, such as the image forming system 1.

The printer 2 can output, for recording, an image that is read by the scanner 3, or can output image data from an external connection apparatus, which is an image processing apparatus, such as a personal computer. The printer 2 is provided with an electronic photo processor 20 in a middle of a right side thereof. A core part of the electric photo processor 20 is a photosensitive body 200 in a drum shape.

Figure 3:
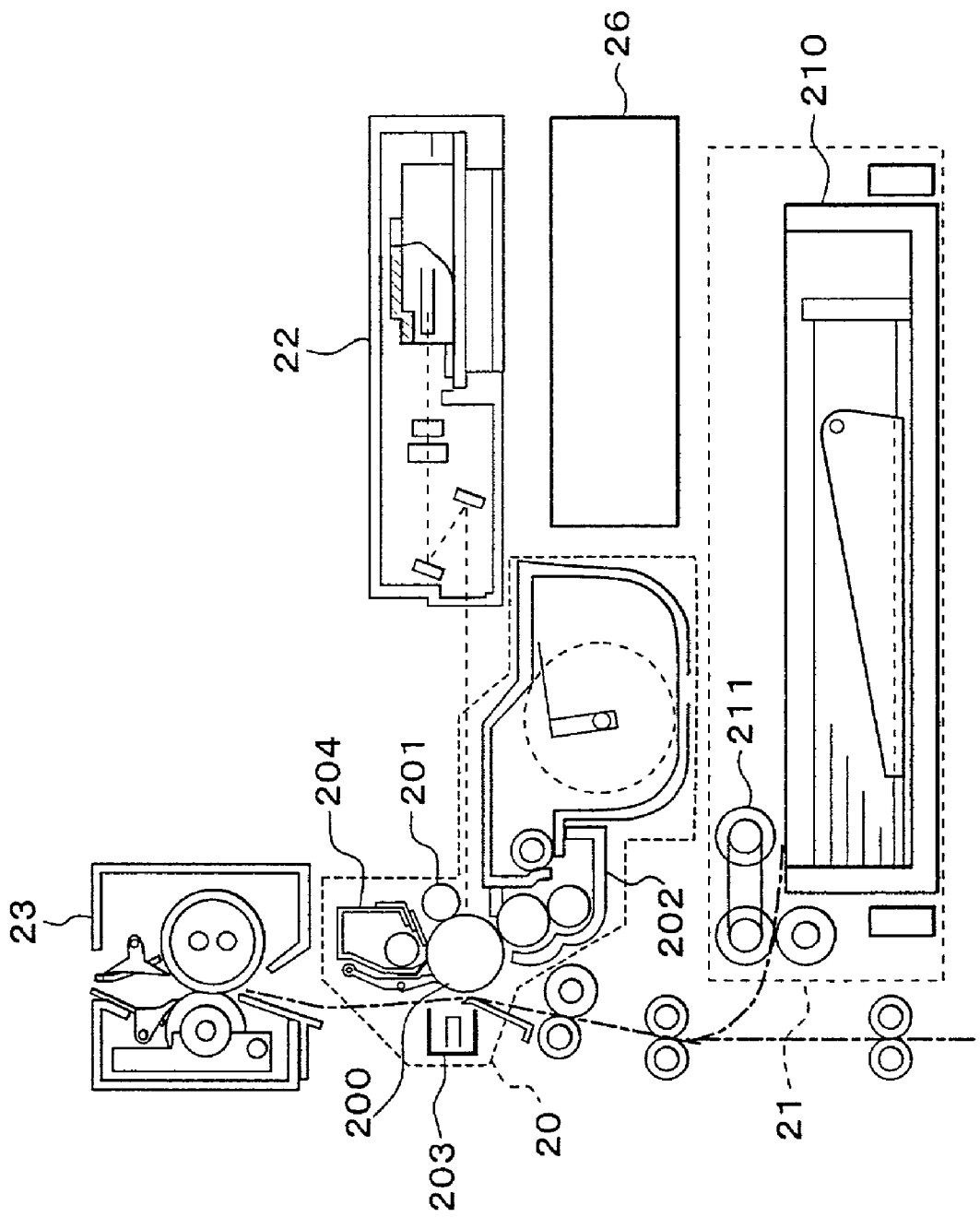
FIG. 3 is an enlarged view of main parts of the image forming system.

Provided around the photosensitive body 200, as shown in FIG. 3, are a charging roller 201, an optical scanning unit 22, a developing unit 202, a transcribing unit 203, a cleaning unit 204, and a discharging lamp unit (not shown), in this order.

The charging roller 201 evenly charges a surface of the photosensitive body 200. The optical scanning unit 22 scans and writes an optical image onto the evenly-charged photosensitive body 200, so as to write an electrostatic latent image thereon. The developing unit 202 develops the electrostatic latent image, which is written by the optical scanning unit 22, to an image by using a developing agent. The transcribing unit 203 transcribes onto a sheet the image recorded and reproduced on the photosensitive body 200. The cleaning unit 204 removes the developing agent left on the photosensitive body 200, thereby making it possible to record a new image on the photosensitive body 200. Further, the discharging lamp unit removes the charge on the surface of the photosensitive body 200.

Under a main body of the printer 2, provided is a sheet feeder 21 built in the main body of the printer 2. The sheet feeder 21 is composed of a sheet containing tray 210 for containing sheets, and a separate-feeding means 211. The separate-feeding means 211 feeds, separately in a sheet-by-sheet manner, the sheets from the sheet containing tray 210. The sheets, fed from the sheet feeder 21 separately in the sheet-by-sheet manner, are fed one by one between the photosensitive body 200 and the transcribing unit 203 of the electronic photo processor 20, so that the image recorded and reproduced on the photosensitive body 200 is transcribed. In addition, the supply of the sheets to the sheet feeder 21 is carried out in such a manner that the sheet containing tray 210 is pulled out in a front direction with respect to the main body of the printer 2, and the sheets are replenished therein.

At a bottom surface of the main body of the printer 2, provided is a sheet inlet 27 for receiving a sheet transferred from the multi-staged sheet feeding unit 6 or the like unit, which is provided as a peripheral apparatus. The sheet is entered through the sheet inlet 27 to be fed one by one between the photosensitive body 200 and the transcribing unit 203 of the electronic photo processor 20.

Above the electronic photo processor 20, a fixing device 23 is provided. The fixing device 23 carries out thermal fixation of the developing agent, which is transcribed onto the sheet, on which the image is transcribed by the electronic photo processor 20. After the thermal fixation, the sheet is sent out of the fixing device 23. The sheet, on which the image is recorded, is passed down to the relaying unit 8 from a delivery-out roller 28 of the printer 2. The relaying unit 8 is located on the top of the main body of the printer 2.

Above or below the optical scanning unit 22, provided are a printer control section 24, an image control section 25, and a power source unit 26, and the like. The printer control section 24 contains a process control unit (PCU) substrate and an interface substrate. The PCU substrate controls an electronic photo process, while the interface substrate receives image data inputted externally. The image control section 25 is provided with an image control unit (ICU) substrate for carrying out a predetermined image process with respect to the image data received by the interface substrate, so that the optical scanning unit 22 scans and reads the image. Further, the power source unit 26 supplies electricity to those substrates and units.

The multi-staged feeding unit 6, which is an externally-attached sheet feeding device, is provided with three sheet feeders 61, 62, and 63. Sheets are contained in sheet containing trays 610, 620, and 630, respectively provided to the sheet feeders 61, 62, and 63. The sheets are separated sheet-by-sheet by separate-feeding means 611, 621, and 631, and supplied toward a sheet outlet 65, provided on a top of the multi-staged sheet feeding unit 6. The sheet outlet 65 has communicative connection with the sheet inlet 27 of the printer 2.

The image forming system 1 of the first embodiment is so adopted that one of the sheet feeders 61, 62, and 63 that contains sheets of a desired sized is selectively operated when the image forming system 1 is operated. Moreover, the supply of the sheets to the sheet feeders 61, 62, and 63 is carried out in such a manner that the sheet containing trays 610, 620, and 630 are pulled out in a front direction with respect to the main body of the multi-staged sheet feeding unit 6, and the sheets are replenished therein. In the sheet feeders 62 and 63, sheets of a same size are contained.

Moreover, the multi-staged sheet feeding unit 6, which is so adopted that the printer 2 and the sheet post-treatment apparatus 5 are placed on the top of the multi-staged sheet feeding unit 6, is provided with wheels 67 and stoppers 66 at a bottom thereof, so that the multi-staged sheet feeding unit 6 can be moved and fixedly placed (stationed) between system racks 7, with the printer 2 and the sheet post-treatment apparatus 5 on the top thereof. In order to move the multi-staged sheet feeding unit 6, the stoppers 66 are screwed upward so as to be off a floor. On the other hand, in order to station the multi-staged sheet feeder 6, the stoppers 66 are screwed downward so as to touch the floor.

Note that, while the first embodiment explains the arrangement provided with three sheet feeders 61, 62, 63 as the multi-staged sheet feeding unit 6, it may be so arranged that the sheet feeders 61 are provided in such a manner that the sheet feeders 61 are piled up in plural stages.

The sheet post-treatment apparatus 5 carries out post-treatment with respect to the sheet on which the image is recorded. In the post-treatment (such as staple treatment and sort treatment), the sheet, which is delivered out from the relaying unit 8 or the printer 2, is delivered into the sheet post-treatment apparatus 5 by a delivery-in roller 50, which is located on a top of the sheet post-treatment apparatus 5. The sheet post-treatment apparatus 5 illustrated by way of example herein is provided with three delivery-out trays 51a, 51b, and 51c (collectively referred to as delivery-out trays 51), so that gates 52 and 53 are switched over in accordance with a need so as to switch over which one of the delivery-out trays 51 delivers the sheets out. In this way, it is possible to delivery out sheets in accordance with use. For example, the delivery-out tray 51a on an upper stage is used for delivering out sheets for the photocopying mode, and the delivery-out tray 51b on a middle stage is utilized for delivering out sheets for printing mode, while the delivery-out tray 51c on a lower stage is used for delivering out sheet for a fax print-out mode.

The scanner 3 has an auto reading mode and manual reading mode. In the auto reading mode, sheet-shaped documents are automatically fed by the automatic document feeder 4, and scanned sheet-by-sheet to be exposed, so as to read document images. In the manual reading mode, book-shaped documents or document images of sheet-shaped documents, which cannot be automatically fed by the automatic document feeder 4, are set in a manual operation and are read so as to read document image.

The scanner 3 scans and exposes an image on a document set on a transparent document platform 30, by using a first scanning unit 31 and a second scanning unit 32, which move the document platform 30 in such a manner that the movements of the first and the second scanning unit 31 and 32 are respectively at predetermined speeds, so that the image of the document, guided by optical sections such as a mirror, and an image-forming lens 33, are formed on an photoelectric transferring element 34, so as to convert the document image into an electric signal and output the document image as the electric signal.

The automatic document feeder 4 is provided with a document conveying means 41 for conveying a document placed on a document set tray 40 to the document platform 30, and conveying out the scanned document so as to send onto a document delivery-out tray 42. Moreover, the automatic document feeder 4 is so adopted that a front side of the automatic document feeder 4 is lifted up and opened in a rotating manner with respect to a back side (the other side of the front side) thereof so that the sheet-shaped document, which cannot be fed automatically, can be placed on the document platform 30, so as to be scanned.

The relaying unit 8 is a conveying unit that is provided onto a top of a delivery-out tray 29, which is provided to an upper part of the printer 2. With the relaying unit 8, the sheets, on which the image is recorded, and which are delivered out of the printer 2, are introduced toward the sheet post-treatment apparatus 5, which is located on a side of the printer 2 from which the sheets are delivered out. Moreover, the relaying unit 8 has sheet conveying paths 83 and 84. The sheet conveying path 83 is separated from the sheet conveying path 84 on the way, so as to guide the sheets to a delivery-out tray 9, which is formed with an upper surface 82 of the relaying unit 8 and an upper surface 54 of the sheet post-treatment apparatus 5. It is possible to switch over the sheet conveying paths 83 and 84 by switching over a gate 81, which is located at a junction between the two sheet conveying paths 83 and 84.

The delivery-out tray 9, which can be also used as a reverse conveying path for the sheets, realizes image forming on both sides of the sheets, in cooperation with a both-side conveying unit 10, which is externally attached. For this reason, the delivery-out roller 28 can rotate in both ways, forwardly and backwardly.

In case a gate 251 is switched over to the position indicated by the continuous line in FIG. 2, the sheet, which has been subjected to the fixation, is delivered out to the delivery-in roller 50, when the sheet post-treatment apparatus 5 is mounted, while the sheet subjected to the fixation is delivered out to the delivery-out tray 9, when the sheet post-treat apparatus 5 is not mounted. If the delivery-out tray 9 is used as the reverse conveying path as discussed above, the sheet is delivered back in, and conveyed reversely into a conveying path 250, via the gate 251 switched over to the position indicated by the broken line. In this manner, it is possible to form the image on both sides of the sheet.

Figure 4:
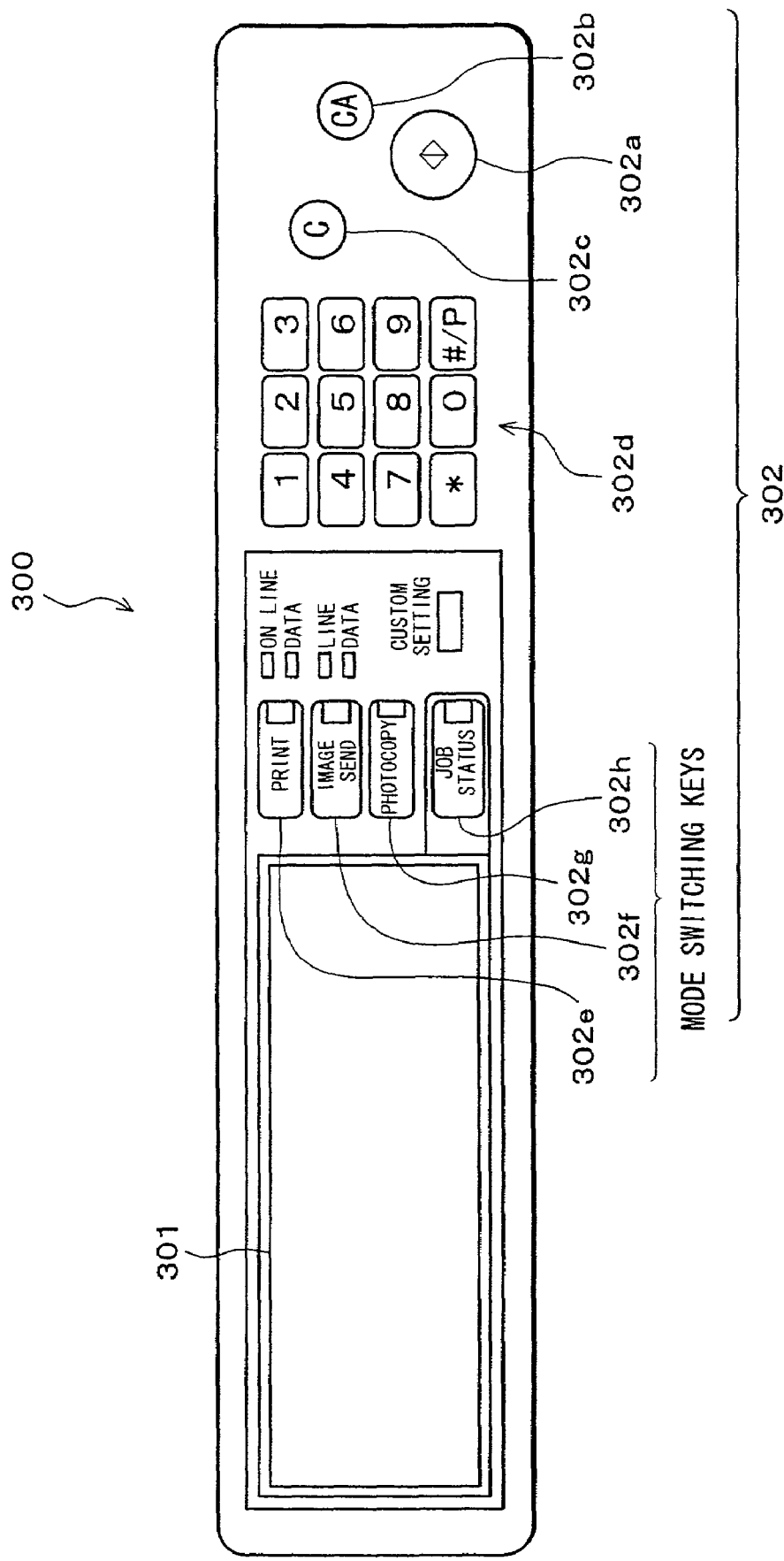
FIG. 4 is an explanatory view illustrating an operation panel provided with a large-sized LCD. The operation panel is for the scanner of the image forming system.

Next, an operation panel (display input means) provided to the scanner 3 is explained, with reference to FIG. 4. FIG. 4 illustrates an operation panel 300, which is mounted on an upper surface of the scanner 3. In the first embodiment, the whole system can be controlled by using the operation panel 300. The operation panel 300 is provided with a display section (large-sized display section) 301, which is a large-sized LCD, and an operation section 302, provided with various keys.

The various keys of the operation section 302 are namely: a start key 302a, an all clear key 302b, a clear key 302c, ten keys 302d, and a mode switching key group composing of a printing mode key 302e, an image sending key (scanning mode key) 302f, and a photocopying mode key 302g, and a job status key 302h.

The start key 302a is a key for giving instructions to start a process of a mode set by using the various keys. The all clear key 302b clears whole setting of the image forming system 1, so as to restore a standard condition of the image forming system 1. The clear key 302c clears condition, which is inputted by the ten keys 302d and the like. The ten keys 302d are keys for inputting numerical information such as a number of sheets to be photocopied. The keys (302e, 302f, and 302g) in the mode switching key group are for switching over the modes for the process (process modes). Moreover, the job status key 302h is a display key (key for a standby job display) of a picture plane regarding a job proceeding status.

Figure 5:
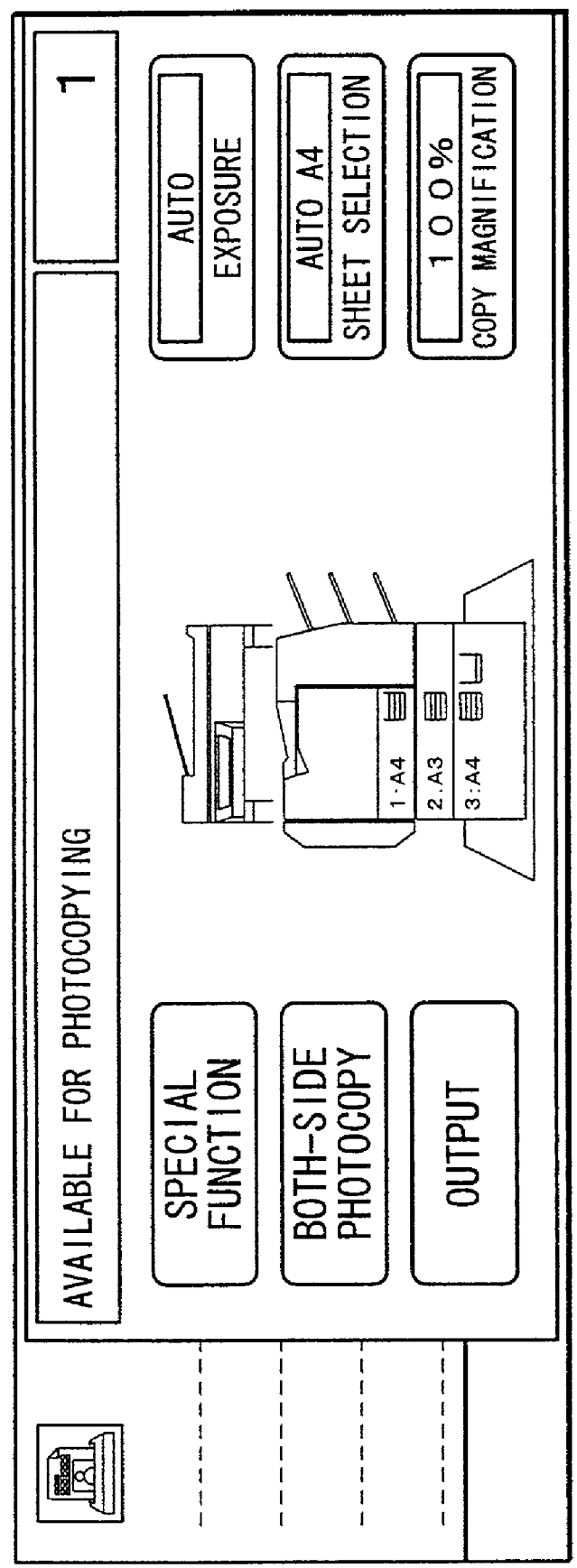
FIG. 5 is an explanatory view illustrating a photocopying mode picture plane, which is a standby picture plane, displayed on the large-sized LCD.
Figure 6:
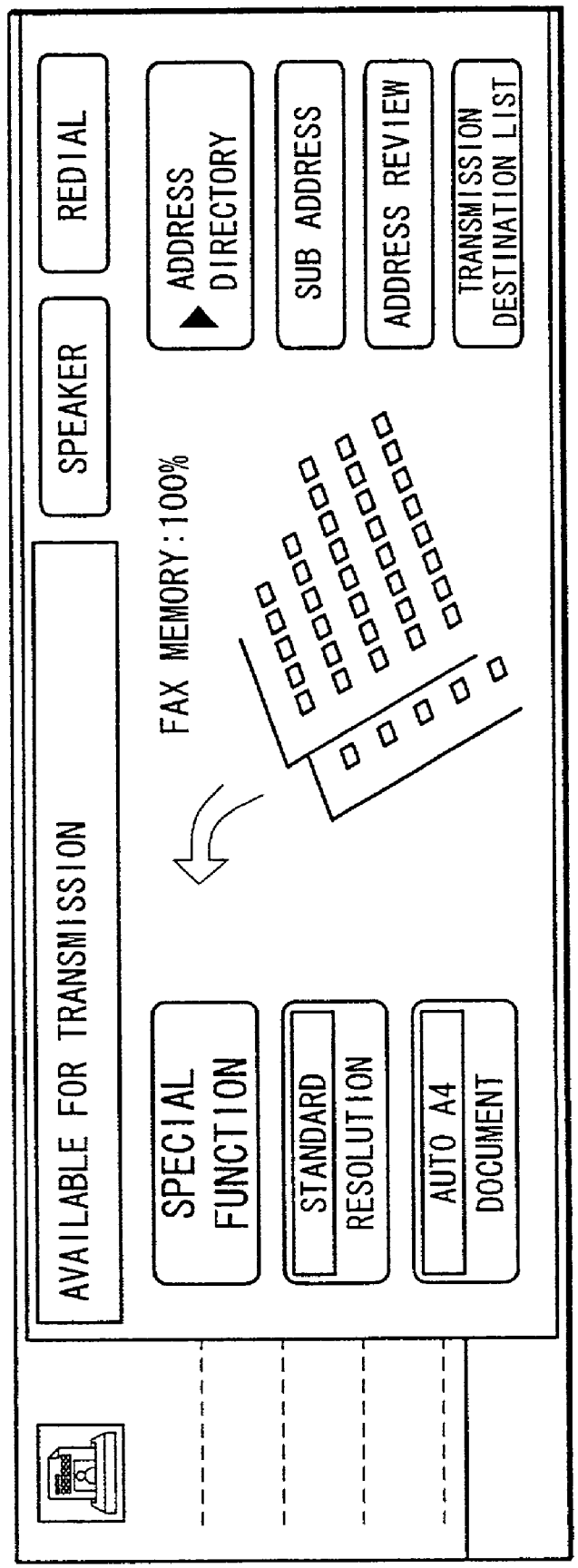
FIG. 6 is an explanatory view illustrating an image sending mode picture plane displayed on the large-sized LCD.

The display section 301 of the operation panel 300 has a default picture plane (standby picture plane), which is a photocopying mode picture plane as shown in FIG. 5. If the image sending key 302f is, for example, pushed in order to switch over the process mode, the process mode is switched over from the photocopying mode to the image sending mode. In response to this, the display section 301 displays a picture plane shown in FIG. 6. Here, the scanning mode is a process mode in which the document read by the scanner 3 is transmitted to a receiver. Examples of the scanning mode include fax communication, SCAN TO E-mail, SCAN TO FTP (FTP: File Transfer Protocol) and the like.

Furthermore, the job status key 302h is the display key (key for the standby job display) of the picture plane regarding the job proceeding status. When the job status key 302h is pushed, a picture plane as shown in FIG. 7 is displayed, so as to inform a current status of a standby (waiting) job.

Figure 8:
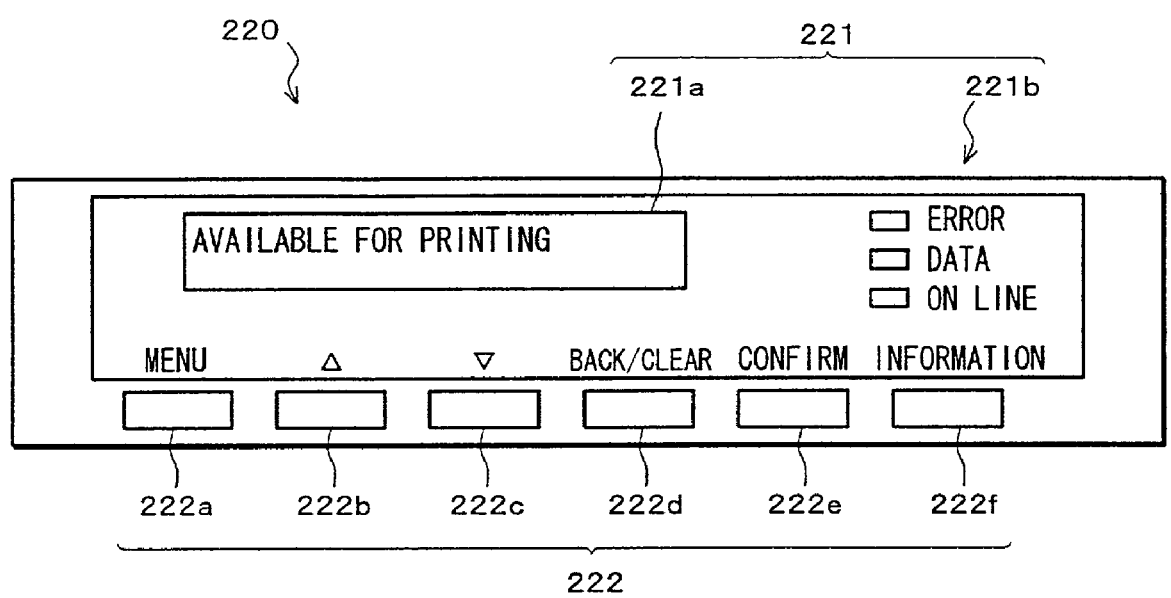
FIG. 8 is an explanatory view illustrating an operation panel provided with a small-sized LCD. The operation panel is provided to a printer of the image forming system.

On the other hand, the printer 2, which can be used individually as discussed above, is provided with an operation panel as a display input apparatus. FIG. 8 shows an operation panel 220, which is provided to the main body of the printer 2. The operation panel 220 is composed of a display section 221 and an operation section 222. The display section 221 is provided with a small-sized LCD 221a for displaying Katakana (a set of Japanese syllabary) in two lines, and a status-displaying LED (Light Emitting Diode) 221b. Moreover, the operation section 222 is provided with a menu key 222a, an up key 222b, a down key 222c, a back/end key 222d, a confirmation key 222e, and an information key 222f.

In the following, described is how information of the printer 2 and the scanner 3 of the image forming system 1 is displayed.

Figure 1:
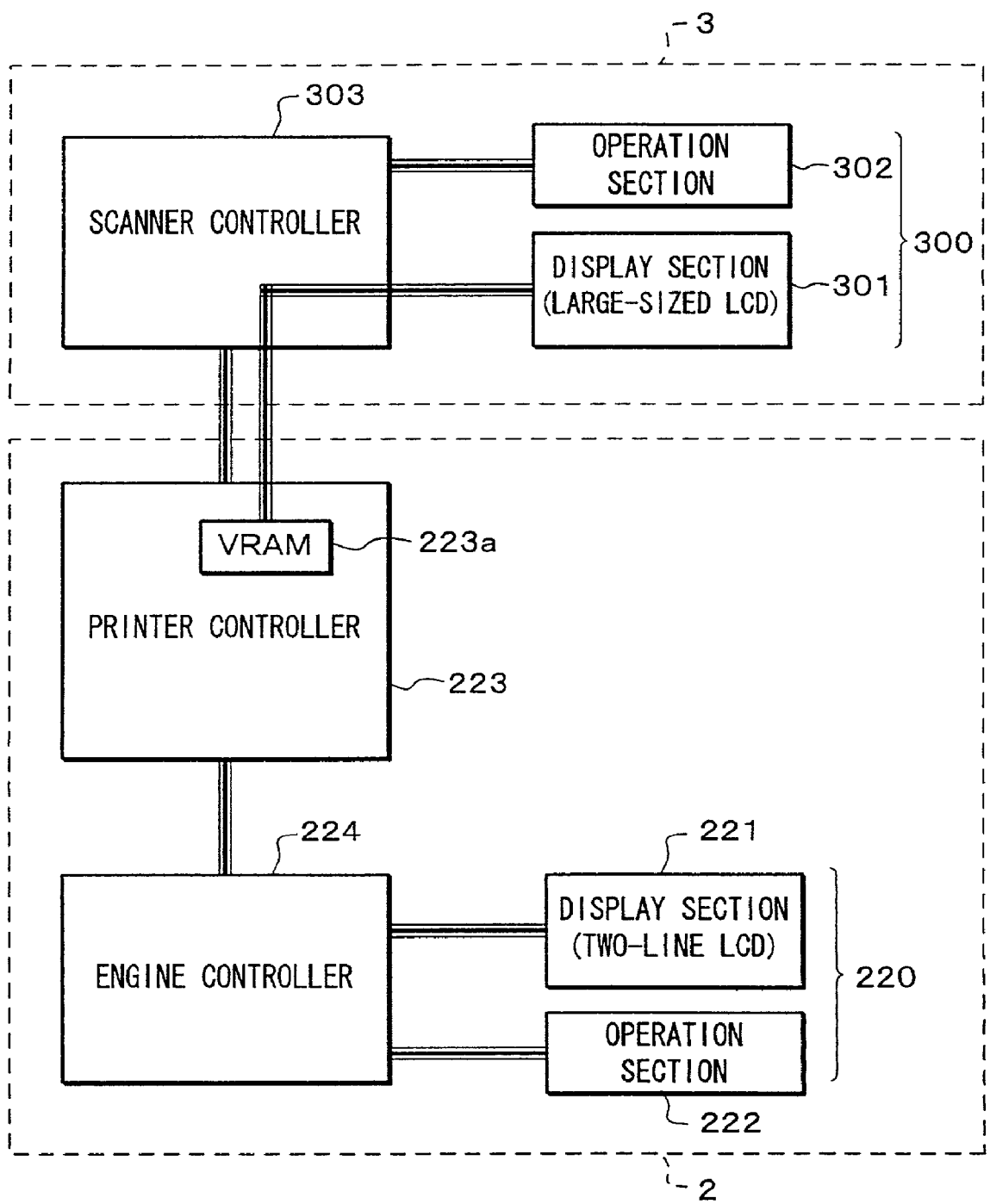
FIG. 1 is a block diagram illustrating display control arrangement as to a printer and a scanner of an image forming system in accordance with a first embodiment of the present invention.

FIG. 1 is a block diagram illustrating display control arrangement as to the printer 2 and the scanner 3.

In the image forming system 1, the display section 301, which is a large-sized LCD, of the scanner 3 carries out the display of detailed information of the printer 2. More specifically, the image forming system 1 is so adopted that the display section 301 of the scanner 3 displays not only information of the scanner 3, but also detailed information of the whole system, including the detailed information of the printer 2. Furthermore, in the first embodiment, it is so arranged that a display section 221, which is a small-sized LCD, of the printer 2 does not show a content identical with that of the information displayed on the display section 301, which is the large-sized LCD, of the scanner 3. In order words, the display section 221 of the printer 2 stops displaying information and the display section 301 of the scanner 3 displays all the information.

The above is specifically explained, hereinafter. The display section 301 of the scanner 3 is linked with a printer controller (control means) 223 of the printer 2 via a busline and the like. In other words, in the image forming system 1, each of detailed information of the scanner 3, the printer 2, and the whole system, which is displayed on the display section 301 of the scanner 3, is wholly controlled by the printer controller 223. Therefore, in the image forming system 1, both display contents of the printer 2 and the scanner 3 are stored in a VRAM (Video Random Access Memory) (display information storing means) 223a of the printer controller 223.

A memory is saved, because the respective detailed information of the printer 2 and the scanner 3 is administered in a unitary manner by the printer controller 223 of the printer 2 in this manner. However, in this case, the VRAM 223a inside the printer 2 also stores, in advance, information regarding content of the display on the large-sized LCD of the scanner 3, providing for the case the printer 2 is combined with the scanner 3 (forming a system). In other words, the VRAM 223a stores both display data to be displayed on the display section (small-sized LCD) 221 of the printer 2, and picture data and character data to be displayed on the display section 301 of the scanner 3.

Moreover, a driver of the display section 221 of the printer 2 is provided with an engine controller 224. Specifically, the engine controller 224 drives the display section 221 of the printer 2 to display in accordance with a character string command, which is transmitted from the printer controller 223. Further, the engine controller 224 detects, as to each key of the printer 2, whether the key is ON or OFF, and outputs a command signal, accordingly. More specifically, the engine controller 224 recognizes which key is pushed, and reports to the printer controller 223 which key is pushed.

Moreover, a scanner controller 303 detects, as to each key of the scanner 3, whether the key is ON or OFF, and outputs a command signal, accordingly. More specifically, the scanner controller 303 recognizes which key is pushed, and reports to the printer controller 223 which key is pushed.

As discussed above, the image forming system 1 can uses the display section 301, which is a large-sized LCD, of the scanner 3 to display the detailed information of the printer 2. Conventionally, for example, the detailed information of the printer 2, such as instructions how to solve jamming, instructions how to exchange an exchangeable unit, and the like, is displayed on a small-sized LCD of the printer 2, whose display is limited to a small number of characters, thereby causing such a problem that the detailed information is hard to understand for a user.

However, with the arrangement of the image forming system 1 of the present invention, for example, it is possible to provide the instructions how to solve jamming in the printer 2, referring to a figure (drawing) on the large-sized LCD. This enables the user to very easily understand the information, compared with the case where only the character message is available, and makes it possible that complicated operation such as solving jamming is carried out promptly.

Explained below is a concrete example, comparing the display on the large-sized LCD, which is the display section 301 of the scanner 3, and that on the small-sized LCD, which is the display section 221 of the printer 2, with reference to FIGS. 9 to 14.

Figure 9:
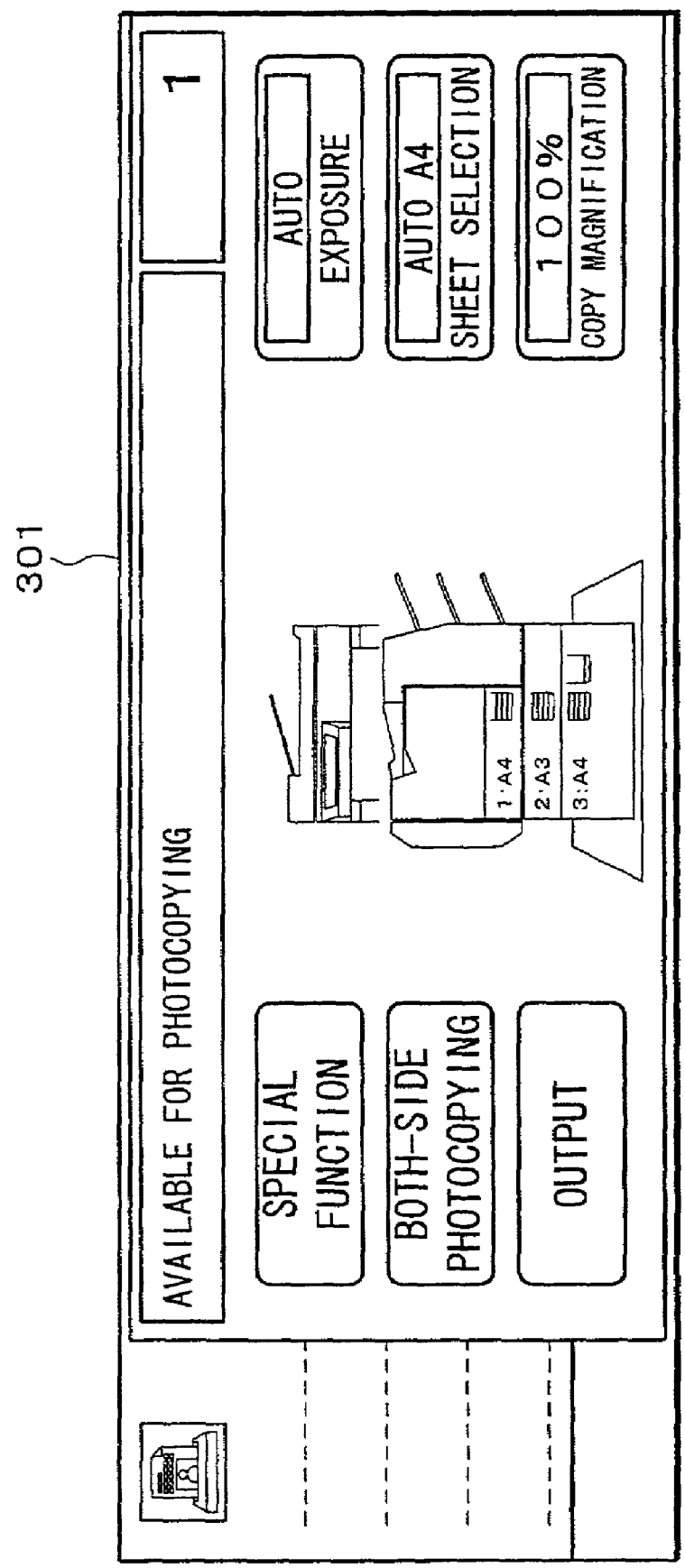
FIG. 9 is an explanatory view illustrating a photocopying mode picture plane, which is a standby picture plane, displayed on the large-sized LCD.

Firstly, shown in FIG. 9 is a default picture plane (standby picture plane) on the large-sized LCD of the display section 301 of the scanner 3. On standby, the image forming system 1 is set in the photocopying mode. Therefore, the default picture plane is the photocopying mode picture plane.

Figure 10:
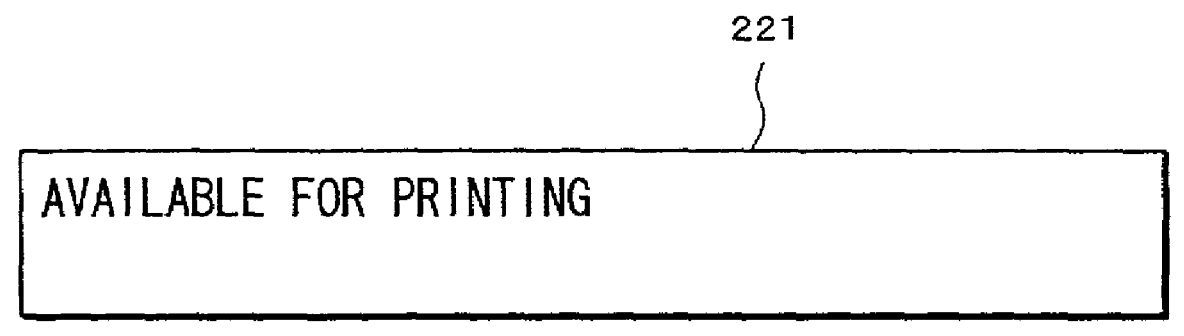

On the other hand, when the display is carried out on the small-sized LCD of the display section 221 of the printer 2, the standby picture plane is as shown in FIG. 10. Because the display section 221 is provided in order to display the information of the printer 2, only the information of the printer job can be displayed in this case.

Figure 11:
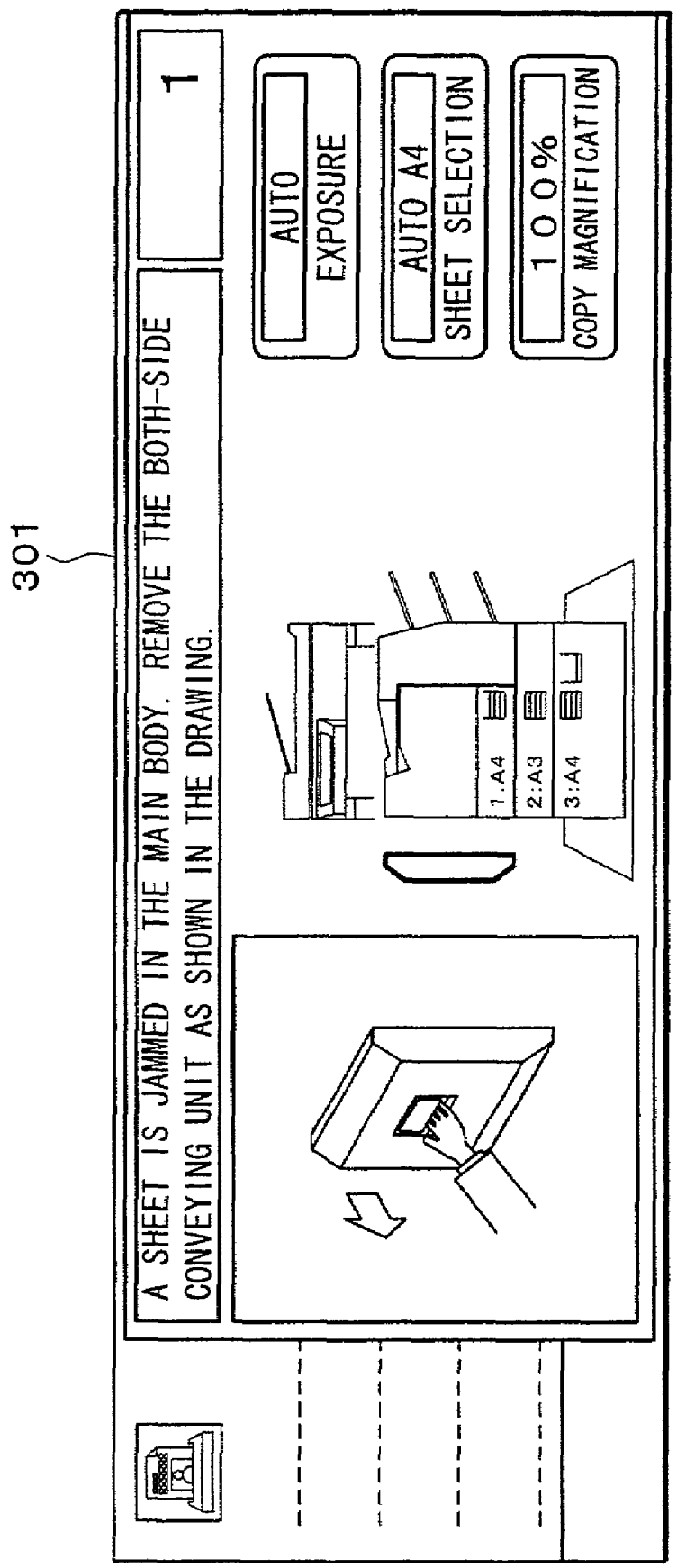
FIG. 11 is an explanatory view illustrating display of instructions how to solve jamming, which is displayed on the large-sized LCD.

Next, FIG. 11 illustrates a display picture plane on the large-sized LCD, when jamming is caused in a vertical conveying path of the printer 2. As shown in FIG. 11, the instructions how to solve jamming are explained with a drawing on the large-sized LCD. Here, in the outer appearance view of the image forming system 1, a position of the both-side conveying unit 10 is illustrated in a different manner from a way the other parts are illustrated, so as to draw attention of the user. For example, an outline of the both-side conveying unit 10 is blinked in the outer appearance view. Further, also displayed in magnification thereon are detailed instructions how to open the both-side conveying unit 10. This makes it possible to explain to the user the instructions how to solve jamming, explicitly. Therefore, the user can understand at a glance how to open which part of the apparatus, in order to remove a jammed sheet.

On the other hand, when the same content is displayed on the small-sized LCD of the printer 2, displayed is merely a character message as short as two lines, as shown in FIG. 12. Because of this, the user has a difficulty to understand the instructions how to solve jamming.

Figure 13:
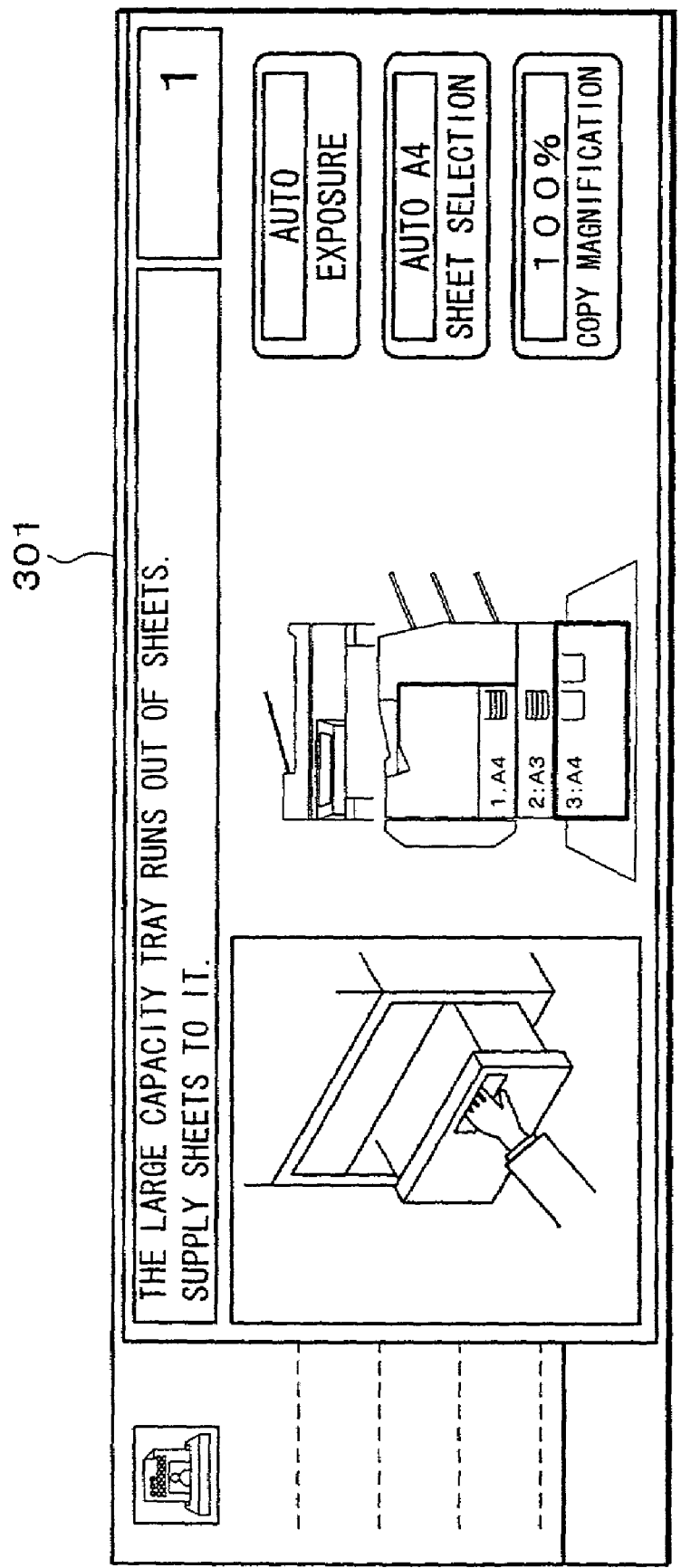
FIG. 13 is an explanatory view illustrating display displayed on the large-sized LCD, shown when sheets are to be replenished (supplied).

Furthermore, FIG. 13 shows a display picture plane of the display section 301 of the scanner 3, when sheets are supplied to sheet containing trays 620 and 630, out of the sheets. The sheet containing trays 620 and 630 have a large containing capacity. In this case again, the display section 301 of the scanner 3 displays the instructions with a drawing. Specifically, in the outer appearance view of the image forming system 1, positions of the sheet containing trays 620 and 630 are displayed in a difference manner from the way the other parts are illustrated so as to draw attention of the user. For example, outlines of the sheet containing trays 620 and 630 are blinked in the outer appearance view. Further, detailed instructions how to pull out the sheet containing trays 620 and 630 are displayed in magnification therein. This gives the user better understanding how to supply the sheets, thereby making it easy to operate the apparatus.

On the contrary, when the same content is displayed on the small-sized LCD of the printer 2, merely a character message as short as two lines is displayed thereon, as shown in FIG. 14. Therefore, it is very hard for the user to understand how to supply the sheets.

As discussed above, the image forming system 1 of the present invention, which is structured by combining the scanner 3 with the printer 2 provided with the display section 221 and capable of being used individually, is so adopted that the detailed information of the whole system, including the printer 2, is displayed on the display section 301 of the scanner 3, which is a large-sized LCD. In this way, a much more amount of information can be displayed, compared with the display on the display section 221 of the small-sized LCD of the printer 2. In the first embodiment, the user can have better understanding of the necessary information, because the information, such as the instructions how to solve jamming, is displayed with a drawing. This can make it easier to operate the system, thereby significantly improving user-friendliness of the system.

In addition, the first embodiment is so adopted that the printer controller 223 inside the printer 2 stores in advance necessary information to display the detailed information of the printer 2 on the display section 301 of the scanner 3. However, not limiting the present invention to this, it may be so arranged that the necessary information for the display on the display section 301 of the scanner 3 is installed lately in the printer 2, when the printer 2 and the scanner 3 are combined to structure the system.

The following methods are concrete examples of the arrangements in which the necessary information for the display on the display section 301 of the scanner 3 is installed lately in the printer 2. For example, an image data and the like data, which is read by the scanner 3, is written on a portable medium, such as a floppy disc, by a drive apparatus properly provided to the scanner 3. Then, the necessary information is read out from the medium by simulating or the like, so as to store the necessary information in the various recording means in the printer 2.

Moreover, as another specific example, it may be so arranged that the printer 2 is provided with a connection section (such as various communication connecters, including a connecter for infrared communication) for connecting to an external apparatus, which is composed of various terminals and the like, so that the necessary information is read out from the external apparatus via the connection section and stored in the various recording means in the printer 2.

As discussed above, in an image forming system of the first embodiment, including a printer for forming an image on a recording medium and a scanner for optically reading a document image, where the printer and the scanner are used in a systematic manner in which the printer and the scanner are used in combination as a system, the printer and the scanner respectively comprises a display section, in such a manner that at least one of the display sections is so controlled to have different display formats for a non-systematic manner and for the systematic manner.

Moreover, in the image forming system, one of the display sections of the printer and the scanner shows information regarding the whole system, when the printer and the scanner are used in combination as the system.

For instance, in the image forming system of the first embodiment, the scanner includes a large-sized display section, which can display drawings, so that detailed information of the printer can be displayed on the large-sized display section of the scanner, when the printer and the scanner are used in combination as the system.

Conventionally, the detailed information, for example, instructions how to solve jamming, instructions how to exchange an exchangeable unit, or instructions how to supply (replenish) sheets, is displayed on the display section of the printer, when the printer and the scanner, each of which can be used in the non-systematic manner, are combined together to form the system. However, the printer is generally provided with a display section, which is generally so small that only about two lines of characters can be displayed thereon.

Therefore, by displaying the information regarding the printer on the display section, which is generally large in size, it is possible to increase an amount of information. Moreover, it is also possible to show a drawing on the large-sized display section. Therefore, it is possible to display, with a drawing, complicated information, such as the instructions how to solve jamming in printer, which is hardly understandable when only explanation in characters is provided. This makes it easier for the user to understand the complicated information, such as the instructions how to solve jamming.

As discussed above, with the arrangement of the first embodiment, the large-sized display section of the scanner is so sufficiently used that the system can be more easily operated, thereby providing a more user-friendly image forming system.

Furthermore, in the image forming system of the first embodiment, it is preferable that the printer includes a control section for controlling the large-sized display section of the scanner, the control section having a display information storing section for storing, in advance, display information for display on the large-sized display section, providing for a case where the printer is used in combination with the scanner.

With the above arrangement, where the printer is provided with the display information storing section for storing in advance the display information for the display on the large-sized display section of the scanner, it is possible to control all the display on the large-sized display section of the scanner by using the control section of the printer. This saves a memory, because the information is managed in a unitary manner.

Moreover, in the image forming system of the first embodiment, it may be so arranged that display information for displaying the detailed information of the printer on the large-sized display section is installed in the printer when the printer and the scanner are used in combination, where the detailed information can be installed by post-installation.

As discussed above, in the arrangement, when the system is formed, the printer is installed with the display information for displaying the detailed information on the large-sized display section. This eliminates a need that the printer should be provided with an additional arrangement to be added on an original arrangement thereof, in other words, a section for storing the information for displaying the detailed information of the printer on the large-sized display section, thereby suppressing an increase in cost.

[Second Embodiment]

Described below is another embodiment of the present invention, with reference to figures.

Figure 15:
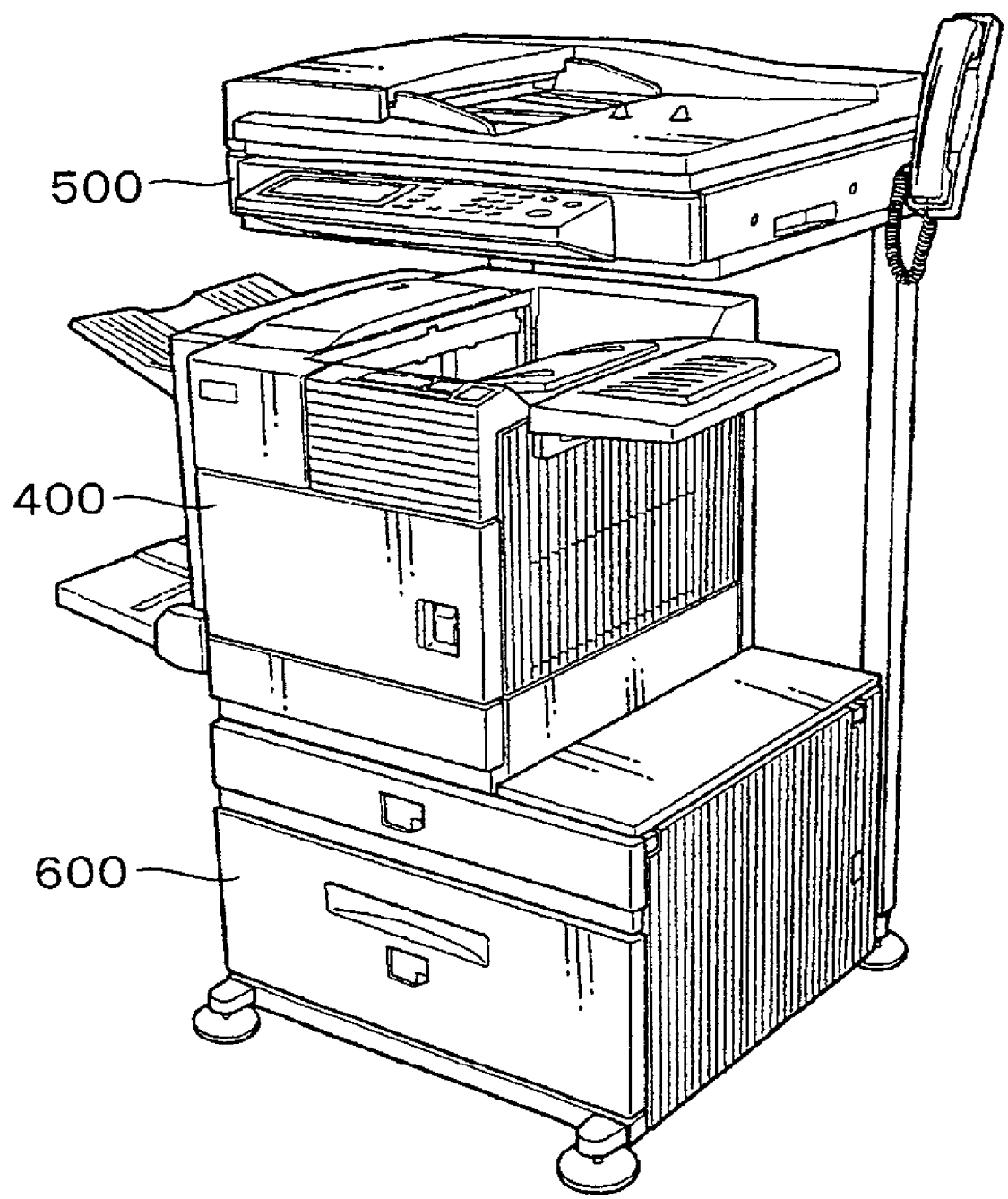
FIG. 15 is a perspective view illustrating an outer appearance of a digital photocopying machine in accordance with a second embodiment of the present invention.

An image forming system of the second embodiment is a digital photocopying machine, and is provided with a printer 400 and a scanner 500, which are respectively individual units, as shown in FIG. 15. The printer 400 is provided with a first image processing section for carrying out first image processing, and a first user interface section for displaying information of the first image processing. On the other hand, the scanner 500 is provided with a second image processing section for performing second image processing, and a second user interface section for displaying information of the second image processing.

The printer 400 and the scanner 500 are linked with each other via an interface section. The printer 400 makes the first user interface section of the printer 400 inoperative (inactivated), when the printer 400 confirms the first image processing section and the second image processing section are connected via the interface section. Moreover, it may be so arranged that the first user interface section is provided with detailed information display section and simple information display section so that only the detailed information display section becomes inoperative when the first interface section becomes inoperative.

The printer 400 of the second embodiment forms an image on a recording sheet in accordance with an electronic image data. In addition, the scanner 500 obtains an electronic image data by reading a document image electronically. The printer 400 and the scanner 500 are installed in such a manner that a main body of the scanner 500 is supported in a position above the printer 400 by supporting sections, so as to overlap the printer 400. The printer 400 and the scanner 500 are installed with an adequate clearance between them so that the printer 400 can be used by a user with ease.

Figure 16:
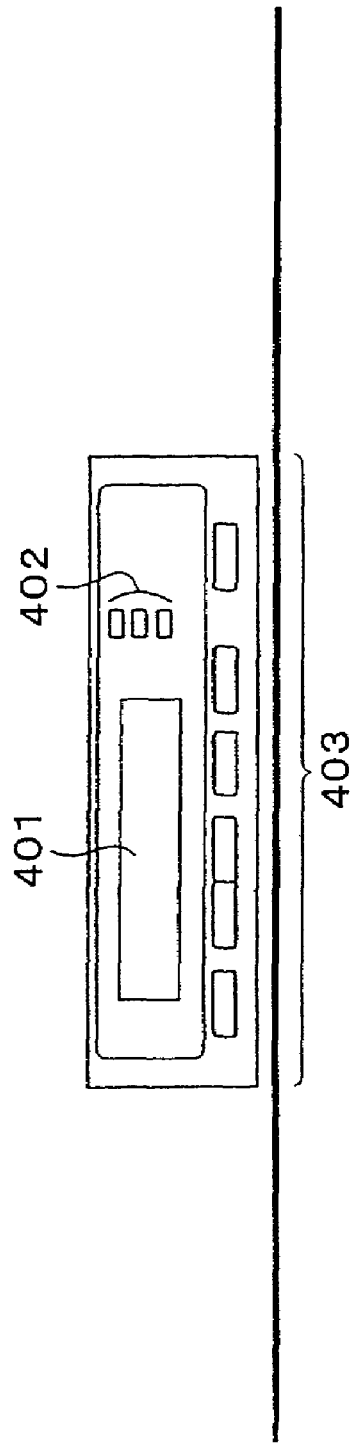
FIGS. 16(*a*) and 16(*b*), are explanatory views illustrating a user interface of the digital photocopying machine, where FIG. 16(*a*) shows a user interface of the printer, while FIG. 16(*b*) illustrates a user interface of the scanner.
Figure 16:
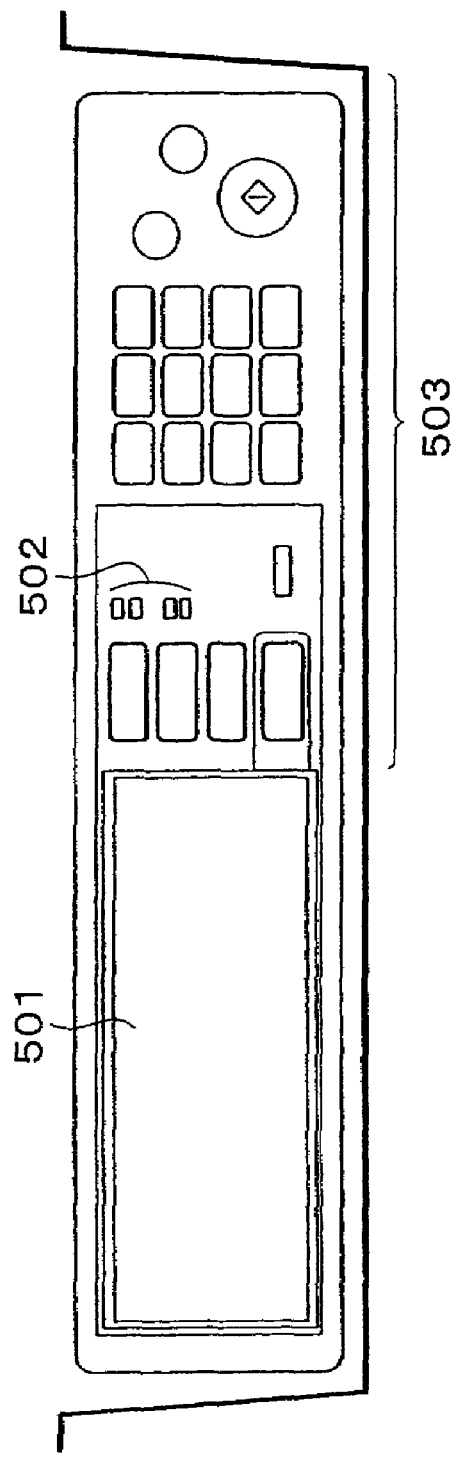

On a top surface of the printer 400, provided is a display section (first user interface section) of the printer shown in FIG. 16(*a*), so as to display mainly information regarding operation instructions or an operation state of the printer 400. The first user interface section is provided with a display panel 401 of dot matrix for displaying detailed information, and an LED display section 402 for displaying simple information. The first user interface section is further provided, in a vicinity of the display panel 401 and the LED display section 402, with an operation key group 403 for performing operation instructions of various modes.

Furthermore, the scanner 500 is provided with an operation panel, which is provided with a display section (the second user interface section) of the scanner shown in FIG. 16(*b*), for displaying mainly information regarding operation instructions or an operation status of the scanner 500. On a left hand side of the second user interface section, a display panel (touch panel display section), which is provided with a transparent tablet on its display screen of the dot matrix. The display panel displays the detailed information or an operation instructions key group. Instructions of the various mode are inputted to the system by pressing the tablet in accordance with the displayed information. Moreover, on a right hand side of the display panel, an LED display section 502 for displaying a state of the system in a simple manner, and an operation key group 503 for instructing the system to change to another various mode.

Moreover the digital photocopying machine having the above arrangement can be connected to a plural external apparatuses, such as personal computers or telephone terminal devices, via a network line. An image data transmitted from the network-linked external apparatus via the interface is preliminarily sent to the image processing section of the digital photocopying machine. After the predetermined process is carried out, the image data is reproduced and recorded as an image and outputted by the image recording section.

Furthermore, the printer 400 of the digital photocopying machine having the above arrangement can be operated solely as a printer. When the printer 400 is operated solely as a printer, the printer 400 reproduces and records on a recording medium an image from the image recording section in accordance with the image data transmitted via the interface from the external apparatus linked via the network or the like.

Figure 17:
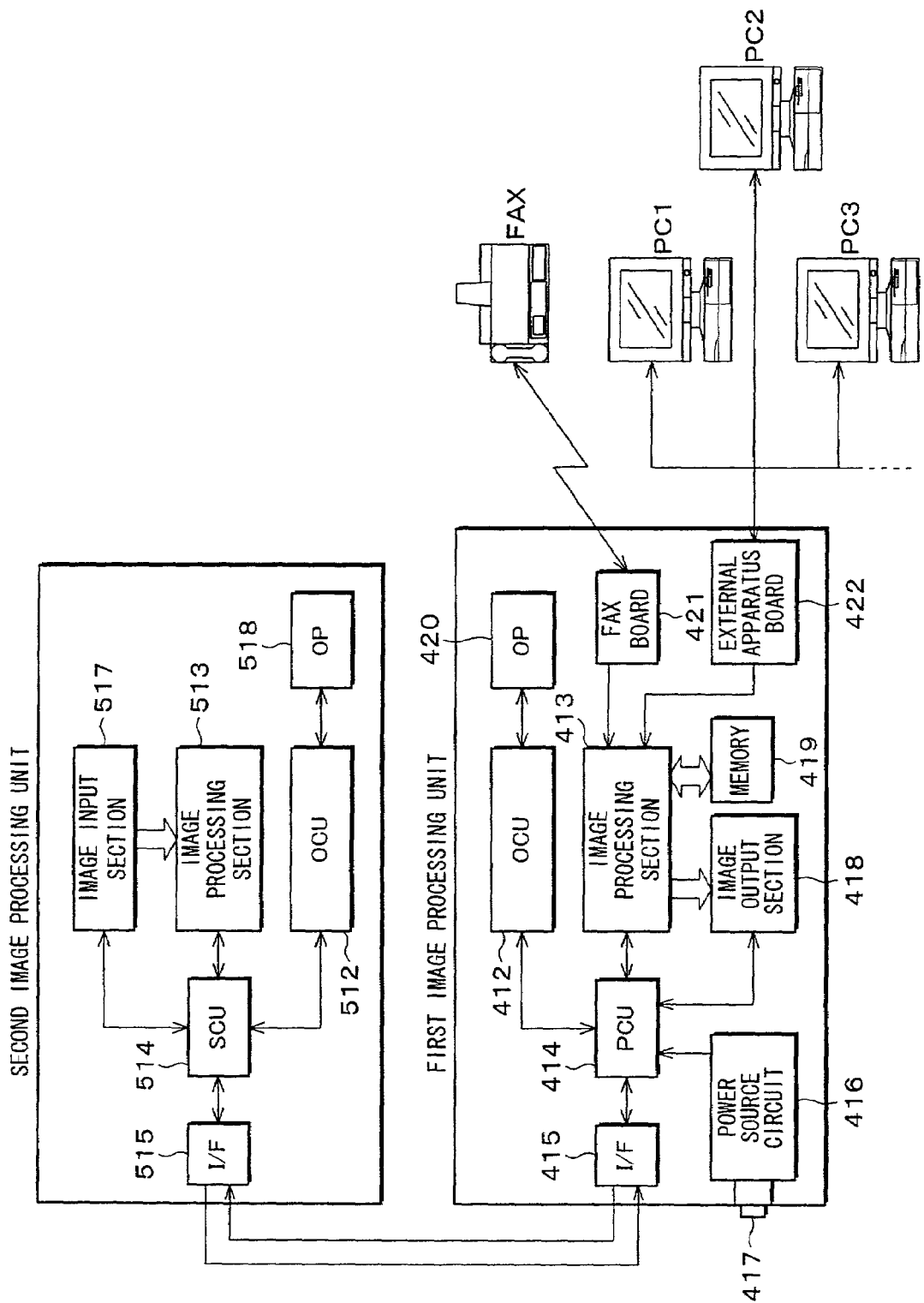
FIG. 17 is a block diagram showing the digital photocopying machine.

The printer 400 (the first image processing unit) of the second embodiment is, as shown in FIG. 17, provided with an operation panel control unit 412 (hereinafter, just referred to as an OCU 412), an image processing section 413, a process control unit 414 (hereinafter denoted as a PCU 414), an interface 415 (hereinafter, denoted as an I/F 415), a power source circuit 416, a switch 417, an image output section 418, a memory 419, an operation panel (OP) 420, a fax board 421, and an external apparatus board 422. Moreover, the first image processing unit 411 is linked with another fax apparatus via the fax board 421, and linked with PCs 1 to 3, which are external apparatuses, via the external apparatus board 422.

On the other hand, the scanner 500 (the second image processing unit) is provided with an operation panel control unit 512 (hereinafter, just referred to as an OCU 512), an image processing section 513, a scanner control unit 514 (hereinafter, denoted as an SCU 514), an interface 515 (hereinafter, referred to as an I/F 515), an image input section 517, and an operation panel (OP) 518.

In the printer 400, the OCU 412 uses the operation panel 420 to display various information of the printer 400 and to receive instructions from the user. The image processing section 413 processes the image data. The PCU 414 controls the whole apparatus. The I/F 415 makes it possible to link the printer 400 with the scanner 500. The power source circuit 416 supplies power to various processing sections in accordance with turning the switch 417 ON. The image output section 418 outputs an image in accordance with the image data processed by the image processing section 413. The memory 419 temporally stores image data to be processed by the image processing section 413 and various control data. The fax board 421 gives capability of fax communication with an external communication apparatus via a communication line. The external apparatus board 422 gives capability of receiving data from a host computer via the network line, so as to print out the data.

Moreover, in the scanner 500, the OCU 512 uses the operation panel 518 to display various information of the scanner 500 and to receives operational instructions from the user. The image processing section 513 carries out a predetermined process with respect to an image data. The SCU 514 controls the whole scanner. The I/F 515 makes it possible to link the scanner 500 with the printer 400. The image input section 517 outputs the image of document as an electronic image data.

In addition, the printer 400 and the scanner 500 are linked with each other by a connection cable, which is integrated into a signal code, via the I/F 415 and 515. With this arrangement, the power is supplied to both the printer 400 and the scanner 500, and various control signals and the image data are transmitted between the printer 400 and the scanner 500.

A system of the second embodiment, which operates as a digital photocopying machine in the following, is explained below. In the explanation, a display format of the user interface is also discussed.

When the printer 400 and the scanner 500 are provided as the image forming system in which the printer 400 and the scanner 500 are combined, the printer 400 is installed above a large capacity sheet feeding unit 600, while the scanner 500 is set on a scanner-supporting rack, which is fixed at a back side of the large capacity sheet feeding unit 600, as shown in FIG. 15. Then, the scanner 500, the printer 400, and peripheral apparatuses (such as the large capacity sheet feeding unit) are connected with each other via means such as a cable and a connector. This completes the installation of the system, whereby the whole system becomes controllable and the power can be supplied thereto.

When the user turns ON a switch for power while the system is in this state, the power source circuit 416 supplies power at a predetermined voltage to the respective processing sections. Then, the respective processing sections are subjected to initial condition check (self-diagnosis check). If no trouble is found in the respective sections, it is judged that the printer 400, the scanner 500, and the peripheral apparatuses can be operated as a system (the system is operative (activated)), and the user interface displays to notify that the system is operative. Moreover, if trouble is detected in any one of the respective sections, it is judged that the system has trouble, and the user interface displays to notify that the system has the trouble.

Here, in case where it is displayed to notify that the system has the trouble, a service personnel is called in so as to deal with the trouble. Moreover, after it is so judged that the system is operative, the system processes the image in accordance with the details instructed via the user interface section, by using the respective sections accordingly. In addition, in the present system, only the user interface of the scanner 500 is utilized for displaying information of the whole system and receiving the operation instructions, while the user interface of the printer 400 is inactivated when it is confirmed that the scanner 500 is connected to the printer 400.

Next, described is a case where, in the image forming system of the second embodiment, the scanner 500 is detached from the printer 400 for maintenance or inspection of the scanner 500, or a change in a network environment.

In case the scanner 500 is detached from the system structure, that is, in case the connection cable for connecting the scanner 500 and the printer 400 is detached, the system is turned OFF once, and then power is turned ON again after the connection cable is detached. Here, the system is subjected to a check, when the predetermined power is supplied to the respective processing sections.

To begin with, carried out by the PCU 414 of the printer 400 is confirmation whether or not the scanner 500 is connected with the I/F 415. Because the scanner 500 is not connected here, it is judged that the system is so structured to be a network printer composing of the printer 400, solely. Further, the system of the network printer is checked, while the user interface of the printer 400 is activated.

In the printer 400, the PCU 414 checks the respective processing sections whether the image process operation is possible or not. Then if it is confirmed that the image process operation is possible, warming up of the printer 400 is started so as to make the printer 400 capable of image processing. In addition, by using the user interface of the printer 400, the PCU 414 notifies the user that the system is not operative, if the trouble is found even in a part of the system.

Moreover, even after the warming up of the printer 400 is started, the PCU 414 operates each section of the printer 400 for checking whether the printer 400 has trouble or not. Then, by using the user interface of the printer 400, the PCU 414 notifies the user that the system is not operative, if trouble is found even in a part of the system.

On the other hand, if the warming up of the printer 400 is completed while no trouble is found, the PCU 414 notifies the user that the network printer is operative, via the user interface of the printer 400. Then, if the network printer, on standby, receives an image data from the host computer, which is connected thereto via the network line, the network printer displays on the user interface of the printer 400 to notify that an image (of the image data) is received from the external apparatus (that is, the host computer in this case), and the received image data is outputted from the printer 400 as a received image.

The external data reception process is so carried out that the image, which is received at the external apparatus board 422 of the printer 400, is expanded, subjected to a predetermined process by the image processing section 413, then printed out from the image output section 418.

Figure 18:
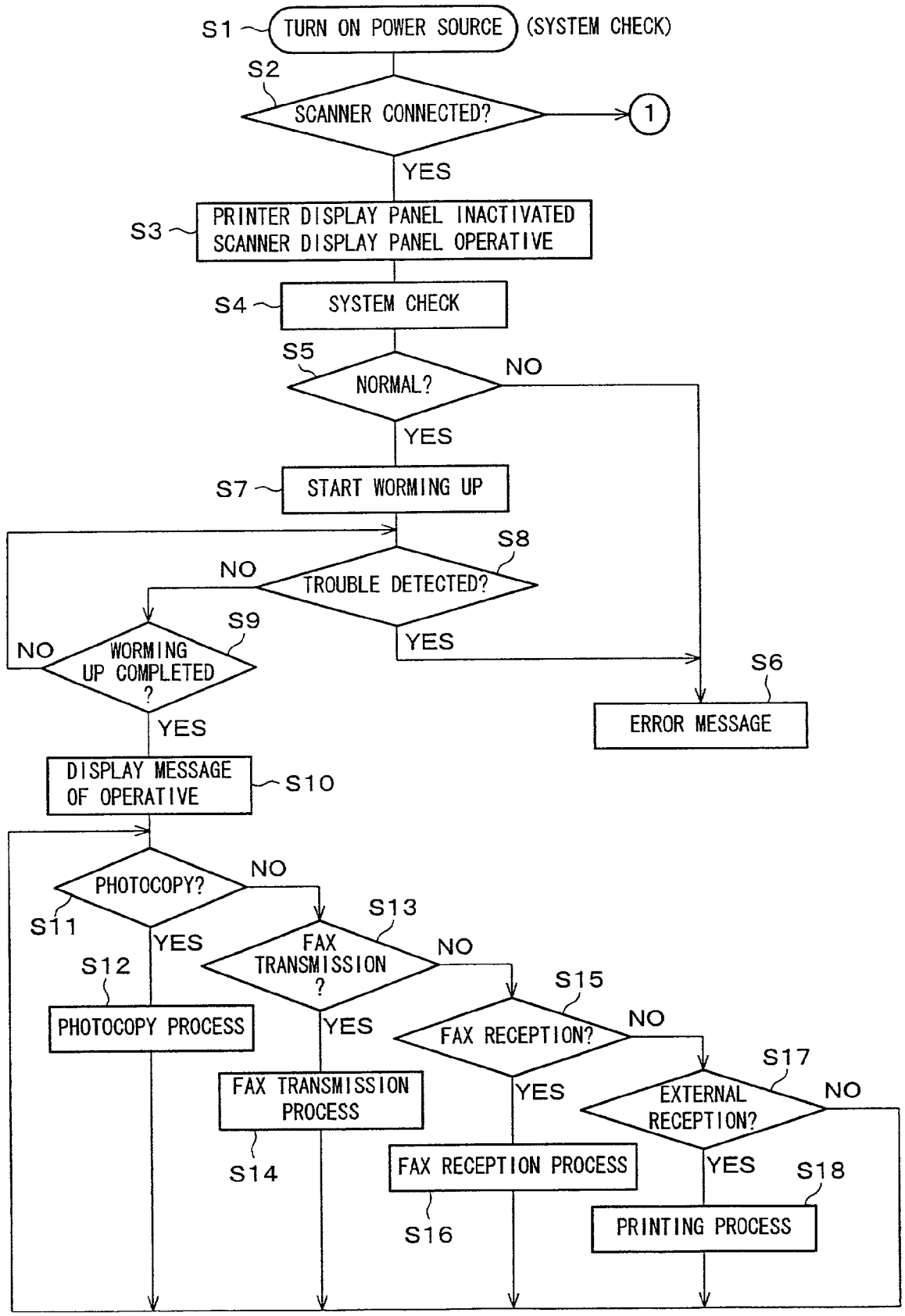
FIG. 18 is a flow chart illustrating a part of image processing of the digital photocopying machine.
Figure 19:
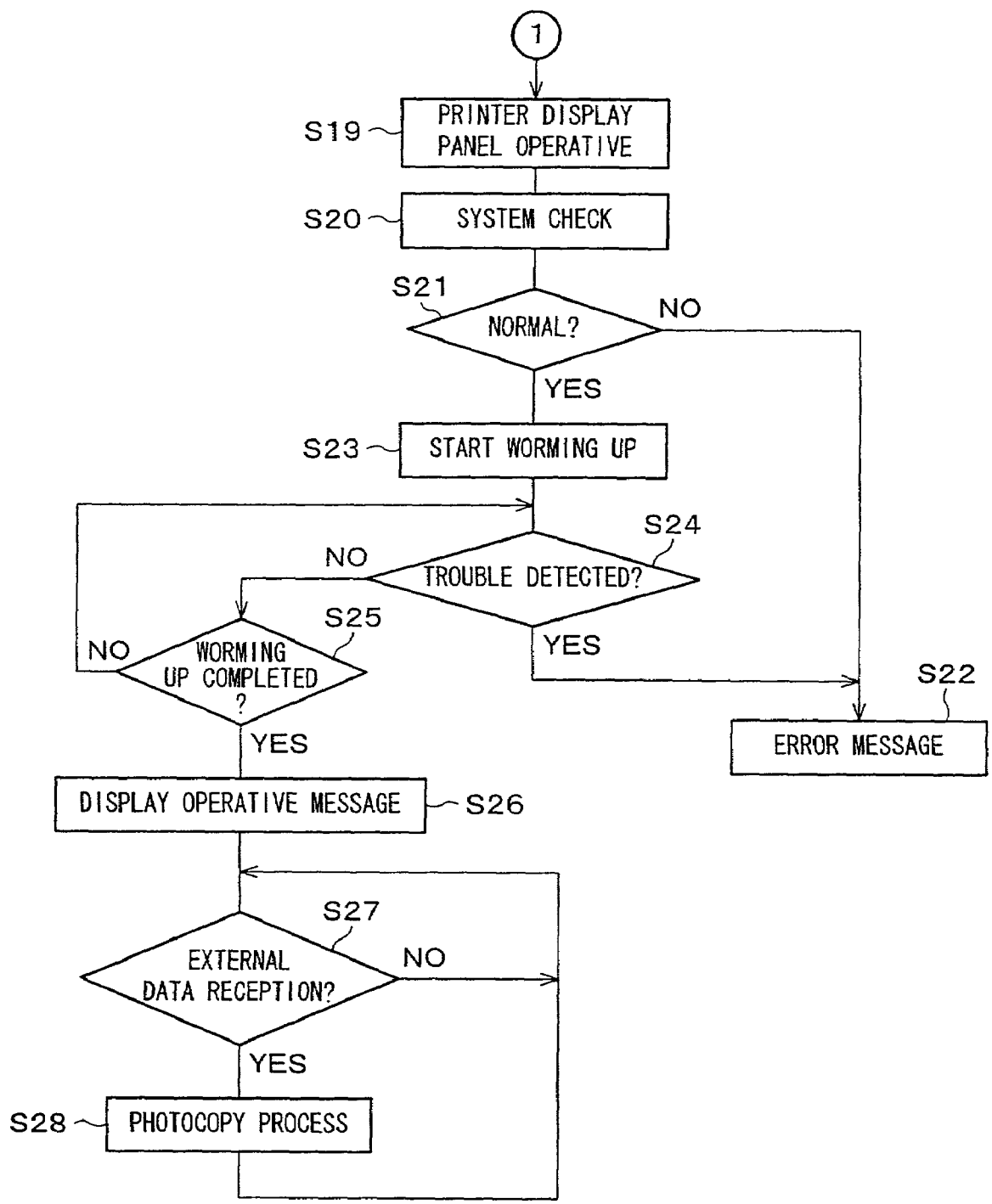
FIG. 19 is a flow chart showing a part of image processing of the digital photocopying machine.

An example of the image processing operation of the image forming system of the second embodiment, with reference to flow charts in FIGS. 18 and 19.

To begin with, a power switch (SW) of the image forming system is turned ON so that a predetermined power is supplied to the respective processing sections while the check of the system is started (S1). During the check, the PCU 414 of the printer 400 confirms, at the initial stage, whether or not the scanner 500 is connected to the interface 415 (S2).

Here, if the scanner 500 is connected, it is judged that the present image forming system is the digital photocopying machine that is composed of the printer 400 and the scanner 500. In this case, the user interface of the printer 400 is inactivated, so that only the user interface of the scanner 500 is operative (S3).

After it is judged that the present image forming system is the digital photocopying machine, the system is further checked (S4). In the printer 400, the PCU 414 checks the respective processing sections therein, while the SCU 514 checks the respective processing sections in the scanner 500, so as to confirm whether or not the image processing operation of the system is possible (S5).

In case trouble is found in the system at 5, The user interface of the scanner 500 displays an error message, so as to notify the user that the system is not operative, and the process is ended (S6).

Moreover, if no trouble is found in the system at S5, thereby confirming that the image processing operation is possible, the warming up is started to warm up the printer 400 and the scanner 500 respectively to be able to perform the image processing (S7).

Furthermore, in the system, even after the warming up of the printer 400 and the scanner 500 is started, the respective sections are operated for checking whether or not trouble is detected in a part of the apparatus (S8). If trouble is detected in a part of the apparatus at S8, the process goes to S6 for displaying an error message. If no trouble is detected at S8, the process goes to S9, for judging whether the warming up is completed, or not.

When the warming up is completed without trouble detected in the system, the system uses the user interface of the scanner 500 to display an message that the system is operative, thereby informing the user that the system can be used as a digital photocopying machine (S10).

When photocopying operation instructions are given via the user interface of the scanner 500 (S11; an answer is Yes), the digital photocopying machine, which has become operative after the completion of the warming up, carries out the photocopying process in accordance with the instructions (S12). In other words, at S12, the printer 400 outputs a photocopied image of the image data of the document read by the scanner 500, in accordance with the instructions to instruct how to carry out the output.

Similarly, when fax transmission instructions are given (S13; an answer is Yes), the digital photocopying machine carries out fax transmission (S14). When a fax image is received (fax reception) (S15; an answer is Yes), the digital photocopying machine carries out the fax reception (S16). When external reception is to be carried out (S17; an answer is Yes), the external reception is carried out by the digital photocopying machine (S18).

The fax transmission transfers the image data of the document read by the scanner 500 to a fax board 191 of the printer 400. Then, the fax board 191 decides a compression method, size, and the like of the image data in accordance with a communication apparatus of the transmission destination, processes the image data according to the decision, and carries out the fax transmission to the communication apparatus of the transmission destination.

The fax reception is carried out when it is judged that the fax image is received from an external communication apparatus via the communication line. The fax reception restores the fax image received by the fax board 191 of the printer 400, and uses the image processing section 413 to subject the fax image to a predetermined process, and prints out the fax image from the image output section 418. Here, the user interface of the scanner 500 displays a message to inform that the fax image is currently being received, and the received image is being outputted from the printer 400.

The external reception is carried out when it is judged that an image data is received from the host computer connected to the system via the network line (external reception). The external reception expands an image received at the external apparatus board 422 of the printer 400, and uses the image processing section 413 to subject the received image to a predetermined process, and prints out the received image from the image output section 418. Here, the user interface of the scanner 500 displays a message to inform that the image data is currently being received from the external apparatus, and the received image is being outputted from the printer 400.

Discussed below is how a process is carried out in case it is judged at S2 that the scanner 500 is not connected with the printer 400 (that is, in a case where the scanner 500 is detached from the printer 400 for maintenance, inspection, or modification of the network environment).

In this case, the present image forming system is regarded as a network printer composed of the printer 400, solely.

Because no scanner 500 is connected to the network printer, the user interface of the printer 400 is activated (S19), and further system check is carried out (S20). In the system check, the PCU 414 checks main processing sections of the printer 400, so as to confirm whether or not the printer 400, as an apparatus, can performs the image processing operation (S21).

If trouble is found even in a part of the system at S21, an error message is displayed on the user interface of the printer 400 (S22), so as to inform the user that the system is not operative. Moreover, if no trouble is detected at S21 and it is confirmed that the image processing operation is possible, warming up of the printer 400 is started (S23).

Even after the warming up is started, the network printer operates the respective sections of the system so as to detect and judge whether or not trouble is in a part of the apparatus (S24). If trouble is detected in the system, the process goes to S22, so as to display an error message.

When the warming up is completed with no trouble detected in the system (S25; an answer is Yes), the network printer uses the user interface of the printer 400 so as to display such a message that the system is operative, thereby informing the user that the printer 400 is operative (S26).

Thereafter, if it is judged that an image data is received from the host computer connected to the system via the network line (external reception) (S27; an answer is Yes), printing process is carried out (S28). The printing process expands the image received by the external apparatus board 422 of the printer 400, uses the image processing section 413 to subject the received image to a predetermined process, and prints out the received image from the image output section 418. Here, the user interface of the printer 400 displays a message to inform that the image data is being received from the external apparatus, and the received image is being outputted from the printer 400.

As discussed above, the image forming system of the second embodiment uses one of the user interfaces of the printer 400 and the scanner 500, which is convenient for the user, depending whether the scanner 500 is attached from the printer 400 or detached to the printer 400.

Note that the explanation in the second embodiment exemplifies the case where the scanner 500 and the printer 400 are connected with each other via the cable to structure the digital photocopying machine as the image forming system, and the case where the scanner 500 is detached from the structure because of the maintenance, the inspection, and the like reason. However, a similar process is carried out in a case where the scanner 500 is added to the structure of the network printer whose basic structure is the printer 400, solely.

More specifically, if the scanner 500 is connected to the printer 400 via the cable while the power is turned OFF, the structure of the image forming system is switched over upon confirmation of the connection of the scanner 500 to the printer 400, when the scanner 500 and the printer 400, which are connected with each other now, are turned ON.

Furthermore, in the above explanation, it is described that the user interface of the printer 400 is inactivated wholly, in the system where the scanner 500 is connected to the printer 400. However, it may be so arranged that the operation states of the printer apparatus, such as "TRANSMITTING", "WARMING UP", "STANDBY", and "TROUBLE", are notified by blinking the LED lamps, so that the user interface of the scanner 500 will not be affected, so as to at least notify which the operation state the printer is in.

In addition, described in the second embodiment is the function to inactivate the first user interface of the first image processing unit (printer 400) when the connection between the first image processing section (image processing section 413) and the second image processing section (image processing section 513) via the interface is confirmed. Computer software, which is composed of a program for causing a computer to execute the function, may be stored in a recording medium such as CD-ROM, so that the software can be read out and used when the software is necessary.

As discussed above, in an image forming system of the second embodiment, including a printer for forming an image on a recording medium and a scanner for optically reading a document image, where the printer and the scanner are used in a systematic manner in which the printer and the scanner are used in combination as a system, wherein the printer and the scanner respectively include a user interface section composed of the display section and an operation section therein, the image forming system further includes (a) a detecting section for detecting connection of the printer and the scanner when the printer and the scanner are connected together as the system, or disconnection of the printer and the scanner when the printer and the scanner are disconnected from each other, and (b) a control section for inactivating one of the user interfaces section of the printer and the scanner when the detection section detects the connection of the printer and the scanner.

With the above arrangement, the user interface section of the one of the printer and the scanner (for example, the user interface section of the scanner) is activated, when the printer and the scanner are connected with each other. Therefore, the information is not displayed in various display formats on more than one of the display sections, thereby providing a user-friendly system, which does not confuse the user.

Moreover, the image forming system of the second embodiment may have the following arrangement.

An image forming system of the second embodiment, including (a) a first image processing unit (for example, a printer) composed of a first image processing section for performing a first image process and a first user interface for displaying information regarding the first image process, and a second image processing unit (for example, a scanner) composed of a second image processing section for performing a second image process and a second user interface for displaying information regarding the second image process, the first and the second image processing unit being connected with each other via the user interface sections, the image forming system further includes a control section for inactivating the first user interface section of the first image processing unit when the control section, by using the user interface sections, confirms that the first and the second image processing unit are connected with each other.

With the above arrangement, only the user interface of the one of the image processing sections is activated when the first and the second image processing unit are connected with each other. Therefore, the information is not displayed in various display formats on more than one of the display sections, thereby providing a user-friendly system, which does not confuse the user.

Furthermore, in the image forming system, the control section activates the first user interface section of the first image processing unit that has been inactivated until then, when the detection section detects the disconnection of the first and the second image processing unit.

This activates the user interface of the first image processing unit when the first image processing unit is detached from the second image processing unit. In this way, the first image processing unit can be used independently, even though the second image processing unit is temporally detached from the second image processing unit, for example, for inspection.

Moreover, in the image forming system, the control section is provided to the first image processing unit.

With this arrangement, where the first image processing unit includes the control section for confirming whether the second image processing unit is connected or not, and for automatically switching over the user interfaces, it is possible to change setting of the system easily, without a need of specially setting the second image processing unit, when setting of the first image processing unit is changed.

Moreover, the image forming system, the control section has a function for determining which of the first and second interface section to be inactivated after confirming, by using the user interface sections, the connection of the first and second image processing unit.

In this way, it is determined which of the first and the second user interface section is to be inactivated, after confirmation whether or not the first and the second image processing unit are connected after the power is supplied. Therefore, even if a state of the connection is changed according to an environmental change, an environment of the user interface is switched over accordingly, automatically detecting the environmental change. Therefore, the environment of the user interfaces can be changed easily without a special operation for switching over.

Moreover, in the image forming system, the first interface section of the first image processing unit includes a detailed information display section and a simple information display section, wherein the control section inactivates only the detailed information display section when the first user interface section is inactivated.

In this manner, only the user interface of the one of the image processing units is activated when the first and the second image processing unit are connected together, while the information of the other image processing unit is displayed on the user interface of the one of the image processing units in such a format that a state of the other image processing unit can be understandable, at least. Therefore, it is possible to provide a user-friendly system that does not confuse the user and does not affect display on the activated user interface.

Moreover, in the image forming system, the first image processing unit is a printer, while the second image processing unit is a scanner.

This allows the image forming system to be used as a network printer, whose basic structure is solely the printer, or as a digital composite machine in which the printer and the scanner are connected together. It is possible to easily provide a system that meets a need of the user only by combining a plurality of apparatuses. Moreover, even in case the scanner is detached from the printer, for example, for the inspection or maintenance of the scanner, because the printer can be solely operated as the network printer, it is possible to avoid such a case where a single trouble makes the whole system inoperative.

[Third Embodiment]

In the first and second embodiment, the scanner for optically reading the document image and the printer for forming the image on the recording sheet (recording medium) forms the image forming system by being installed to have the particular positional relationship, wherein the scanner and the printer are individual units.

In those embodiments, the scanner and the printer are respectively provided with the information display section for displaying the information. Between the two information display sections, the information display section of the scanner (hereinafter, just referred to a scanner display section), which is installed above with respect to the printer, is mainly used to carry out the operation of the whole image forming system. This is because the use of the scanner display section is more convenient for the user, who stands operating the image forming system.

An example of the information display section of the image forming system is illustrated in FIGS. 20(a) and 20(b). FIG. 20(a) shows a scanner display section 700, while FIG. 20(b) illustrates a printer display section 701, which is a display section of the printer. Generally, the scanner display section 700 is, as shown in FIG. 20(a), provided as a part of a scanner control section 702, while the printer display section 701 is provided as a part of a printer control section 703 as shown in FIG. 20(b).

The scanner control section 702 is, as mentioned above, used as a main control section of the image forming system, so that the scanner display section 700 usually shows a state of the whole image forming system by using characters and an image. More specifically, in case of the image forming system, the scanner display section 700 displays the state of the whole image forming system by using the characters and the image, as shown in FIG. 20(a). Meanwhile, the printer display section 701 provided to the printer control section 703 uses the character to inform an operation state of the printer, as shown in FIG. 20(b).

On the other hand, Japanese Unexamined Patent Application, Tokukaihei, No. 8-297388 (published on Nov. 12, 1996), which is a Japanese Patent Publication, discloses an image forming system, in which an LED (Light Emitting Diode) is used as the printer display section. In case of the image forming system of the publication, the error and state (hereinafter, denoted as an operation state) of the printer are displayed on both the LED display section and a liquid crystal display section of a control display section of the scanner.

In the arrangement of the image forming system shown in FIGS. 20(a) and 20(b), the printer display section 701 is covered with the scanner display section 700, so that the printer display section 701 cannot be seen, when the user carries out a usual operation referring to the scanner display section 700. Therefore, it is a problem that the user has a difficulty to see the printer display section 701.

Moreover, even if the image forming system is so installed that the user can see the printer display section 701 when he stands using the image forming system, it is difficult for the user to check an information content of the scanner display section 700 and that of the printer display section 701 at the same time. More specifically, because those information display sections are located with different distances from the user, and the information is given in characters, the user should turn his eyes respectively to the two information display sections in order to check the information on the two information display sections.

On the other hand, the image forming system disclosed in Japanese Unexamined Patent Application No. 8-297388, which uses the LED display section as the printer display section, has the following problems when different processes are carried out respectively by the scanner and the printer. For example, when an error is caused in the printer or an image is processed by the printer while the scanner is operated, the scanner display section also displays information regarding the printer, thereby confusing the user.

In the following, a digital photocopying machine 801 employing an image forming system of a third embodiment, with reference to figures. To begin with, a whole arrangement of the digital photocopying machine and differences between the display contents and the objects of the display on a scanner display section and those of a printer display section in the digital photocopying machine 801, referring to FIG. 21.

Figure 21:
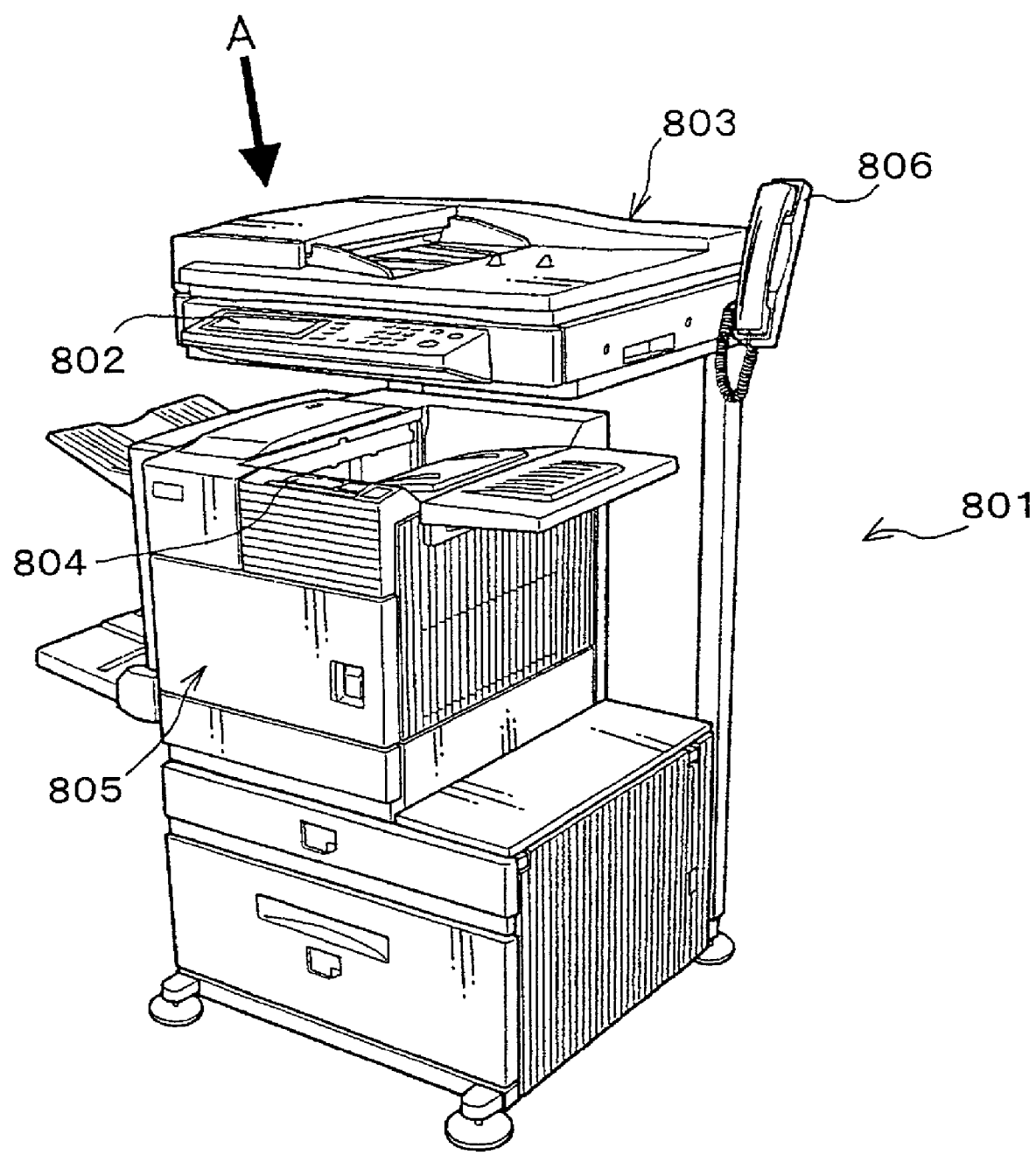
FIG. 21 is a perspective view showing an overall arrangement of a digital photocopying machine of a third embodiment of the present invention.

As shown in FIG. 21, the digital photocopying machine (image forming system) 801 is provided at least with a scanner (function section) 803 having a scanner display section (second information section) 802, and a printer (image forming section) 805 having a printer display section (image forming section) 804.

The scanner 803 and the printer 805 are apparatuses, which are respectively individual units, and are so installed that the scanner 803 is above the printer 805, thereby having a predetermined positional relationship. The scanner 803 is located on a scanner-supporting rack in such a manner that a main body of the scanner 803, which is above the printer 805, overlaps the printer 805. Moreover, the scanner 803 and the printer 805 are so installed as to have a certain gap in their vertical direction so that the user can operate the printer 805 with ease.

The scanner 803 is for electronically reading a document image so as to obtain an electronic image data, while the printer 805 is for forming an image on the recording sheet, in accordance with the electronic image data. Moreover, there is a case where the digital photocopying machine 801 is provided with a telephone terminal section 806, or a case the digital photocopying machine 801 is connected with a plurality of external apparatuses such as personal computers, telephone terminal apparatuses, and the like (not shown), thereby forming a network. In the latter case, an image data transferred thereto via the interface from the external apparatus, which is connected thereto via the network, is firstly sent to an image processing section of the digital photocopying machine 801, and is subjected to a predetermined process. Thereafter, the image forming of the image data is carried out onto the recording sheet from the printer 805.

Figure 22:
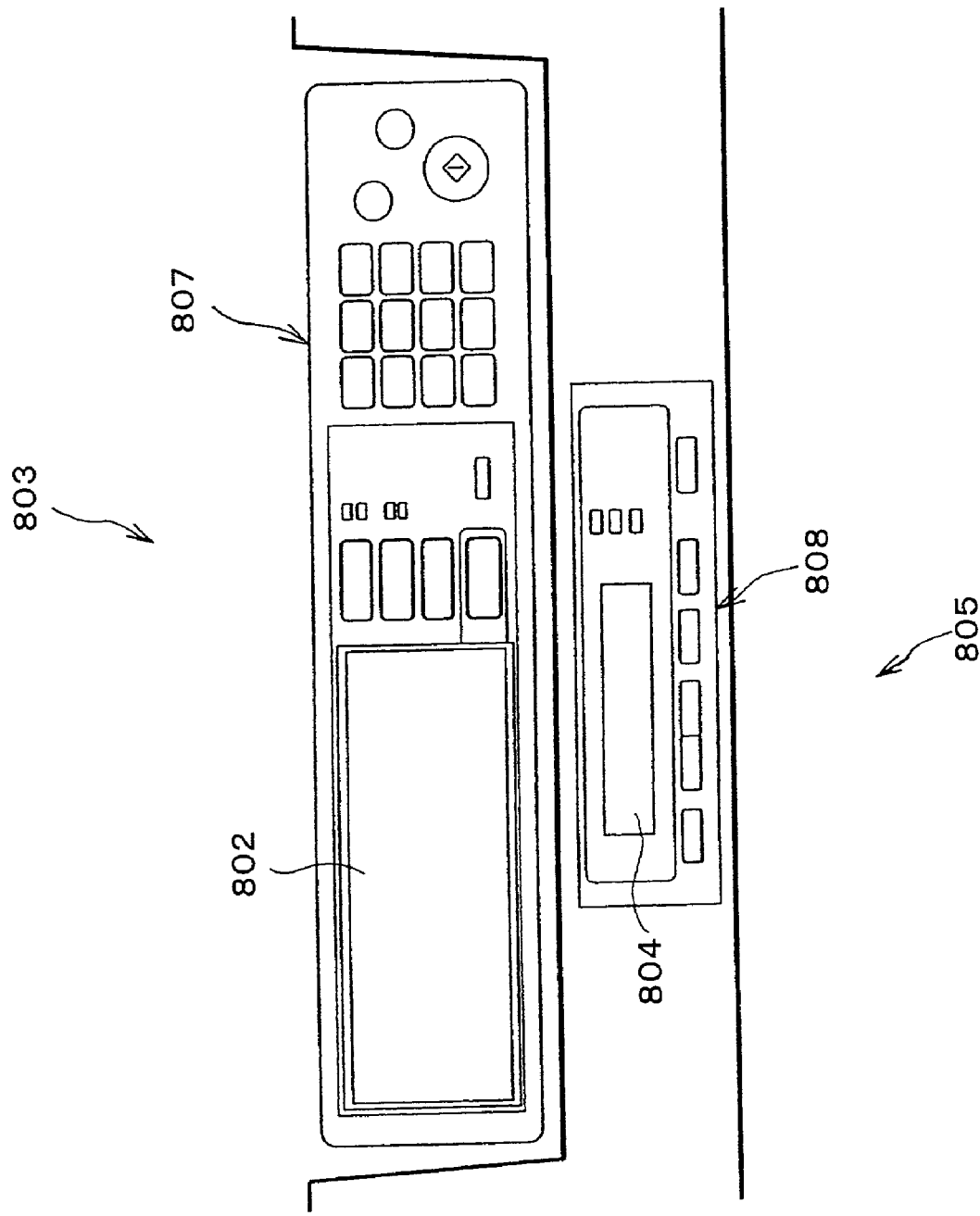
FIG. 22 is an explanatory view showing how an information display section and an operation section are viewed from a position of a user, when the user stands operating the digital photocopying machine.

In the digital photocopying machine 801, the scanner display section 802 is, as shown in FIG. 22, a part of a scanner control section 807, while the printer display section 804 is a part of a printer control section 808. Moreover, the scanner display section 802 mainly displays information regarding instructions how to operate the scanner 803 and an operation state of the scanner 803, meanwhile the printer display section 804 mainly displays information regarding instructions how to operate the printer 805 and an operation state of the printer 805. Furthermore, the scanner control section 807 allows the user to operate the scanner 803 referring to the scanner display section 802, while the scanner control section 807 can let the user to operate the printer 805 so as to form the image.

Based on the differences between the scanner display section 802 and the printer display section 804 in terms of the display contents and objects, the following explanation describes positional arrangement and display methods of the scanner display section 802 and the printer display section 804 provided to the digital photocopying machine 801.

To begin with, the positional arrangement of the scanner display section 802 and the printer 804 is discussed. In FIG. 21, an arrow A indicates from which direction the user looks at the digital photocopying machine 801 when he stands carrying out a usual operation of the digital photocopying machine 801. FIG. 22 shows positions of the scanner display section 802 and the printer display section 804 when the user views the scanner display section 802 and the printer display section 804 from the direction indicated by the arrow A.

In the digital photocopying machine 801, as shown in FIG. 22, the scanner display section 802 and the printer display section 804 are so placed that the scanner display section 802 and the printer display section 804 can be seen next to each other (that is, not overlapping each other) when they are viewed from the direction indicated by the arrow A.

In this manner, the user can see the scanner display section 802 and the printer display section 804 at the same time, while fixing his eyes at a certain region (without turning his eyes from place to place), so that the user can easily check the state of the whole digital photocopying machine 801.

Furthermore, as shown in FIG. 21, the scanner display section 802 may be projected toward a standing position of the user from a main body of the scanner 803. This makes it easier for the user to have the two information display sections within his range of vision. Because of this, the user can concentrate on displays on the scanner display section 802 and the printer display section 804, so that the user can check the state of the whole digital photocopying machine 801 more promptly.

Next, described are display methods of the scanner display section 802 and the printer display section 804 for each case of various operations of the digital photocopying machine 801.

In case the user uses the scanner 803 to read the document, the information of the scanner 803 is always displayed on the scanner display section 802. Moreover, the scanner display section 802 also displays instructions how to photocopy.

Moreover, in case, for example, the printer 805 has trouble such as running out of sheets, or jamming (paper jamming) in a conveying path during its printing operation, the digital photocopying machine 801 does not uses the scanner display section 802 to display a message to inform occurrence of the trouble, but only uses the printer display section 84 to notify the user of the trouble.

This is because the scanner display section 802 and the printer display section 804 are so positioned in the digital photocopying machine 801 that the scanner display section 802 and the printer display section 804 can be seen next to each other from the standing position of the user, as discussed above. In other words, the users can see a picture plane of trouble occurrence (trouble picture plane) on the printer display section 804, even when he operates referring to the scanner display section 802. Furthermore, in this case, even if the trouble is caused in the printer 805 during the operation of the scanner 803, the display of the scanner display section 802 is not switched over with the trouble picture plane, so that the user are notified of the state of the digital photocopying machine 801 without confusing the operation.

However, a warning display only in characters is not preferred, in order to notify the user of the occurrence of the trouble in the printer 805 by using the printer display section 804. The reason is explained below.

Even if the scanner display section 802 and the printer display section 804 are so located that the scanner display section 802 and the printer display section 804 are seen in an almost same position with respect to the user's view (they seems to be next to each other from the direction of the user's view), the scanner display section 802 and the printer display section 804 have the different distances from the user. Therefore, in case the display of the printer display section 804 is replaced with the trouble picture plane, the user does not focus on the printer display section 804, if the user operates referring to the scanner display section 802 at the time of the replacement of the display of the printer display section 804. Thus, the warning display only in characters may not be noticed by the user.

Therefore, the digital photocopying machine 801 is so arranged that the user is notified of the occurrence of the trouble in the printer 805, by using colored information of the printer display section 804, which is within the range of the view of the user, even if the user focuses on information in characters and/or by image displayed on the scanner display section 802 (that is, the user does not focuses on the printer display section 804). This makes it possible to surely inform the user of the operation state of the printer 805 without confusing the operation. Hereinafter, referred to as "colored information" is information indicated by a change in a color of a back light of the printer display section 804.

Figure 23:
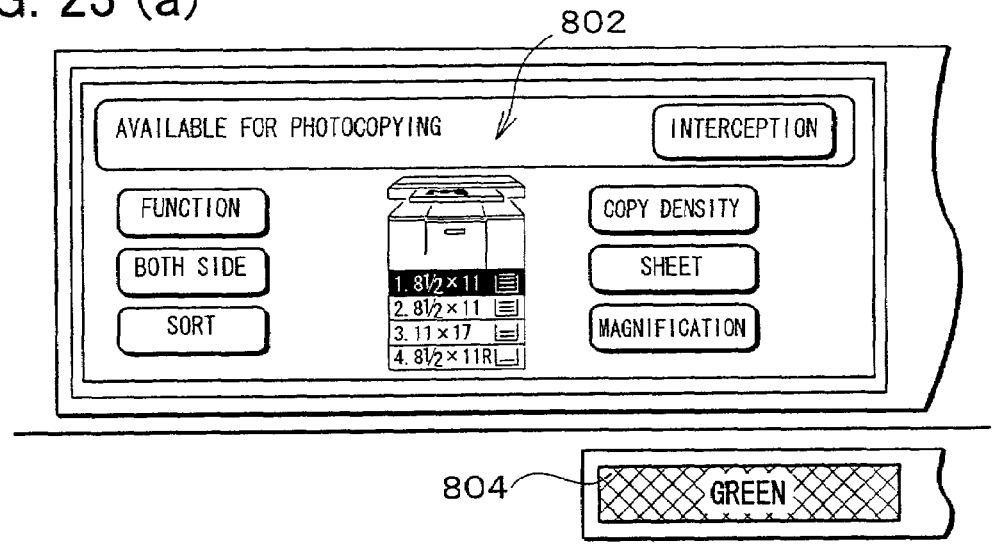
FIGS. 23(*a*) to 23(*c*) are explanatory views illustrating by way of example a display format of the information display section, viewed from the position of the user, when the user stands operating the digital photocopying machine.
Figure 23:
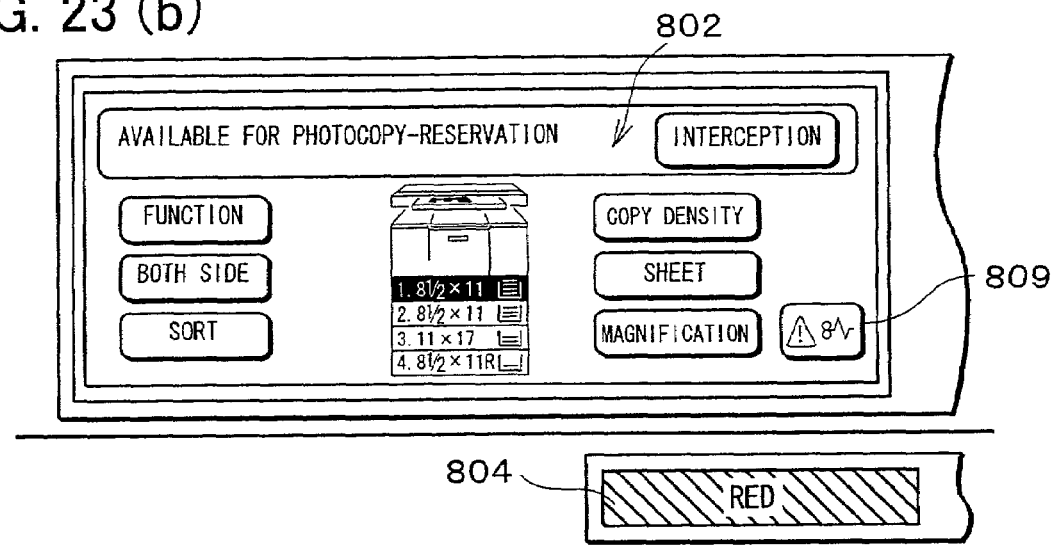
Figure 23:
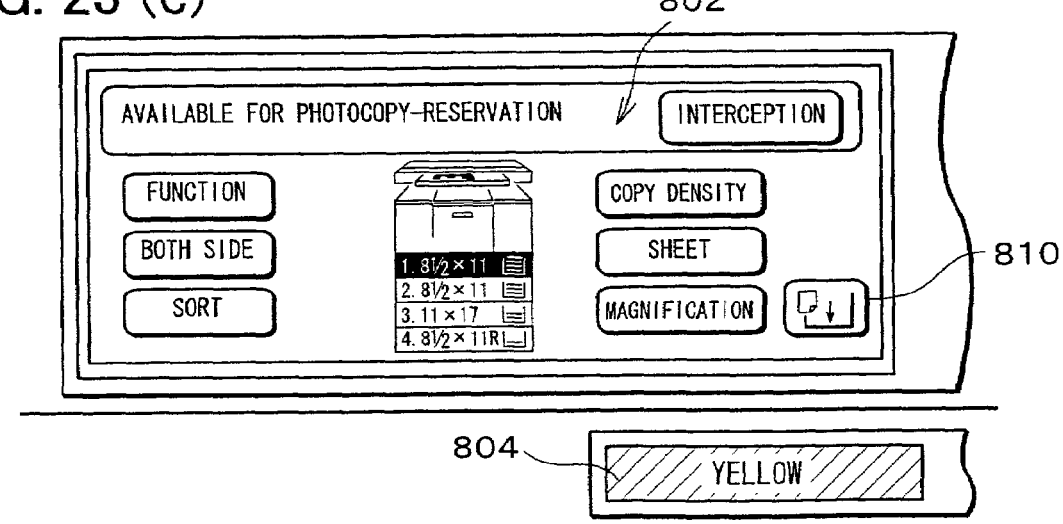

FIGS. 23(a) to 23(c) illustrate concretely display methods of the colored information of the printer display section 804. FIGS. 23(a) to 23(c) show the positional arrangement of the scanner display section 802 and the printer display section 804, which are viewed by the users from the direction of the arrow A shown in FIG. 21.

For example, in case the printer 805 (see FIG. 21) is operated normally, as shown in FIG. 23(a), the printer display section 804 is set to have a back light of a green color. On the contrary, for example, if trouble such as the "paper jamming" is caused, the color of the back light is changed to a red color, as shown in FIG. 23(b), while the color of the back light is changed to a yellow color in case of the "running out of sheets", as shown in FIG. 23(c).

Figure 24:
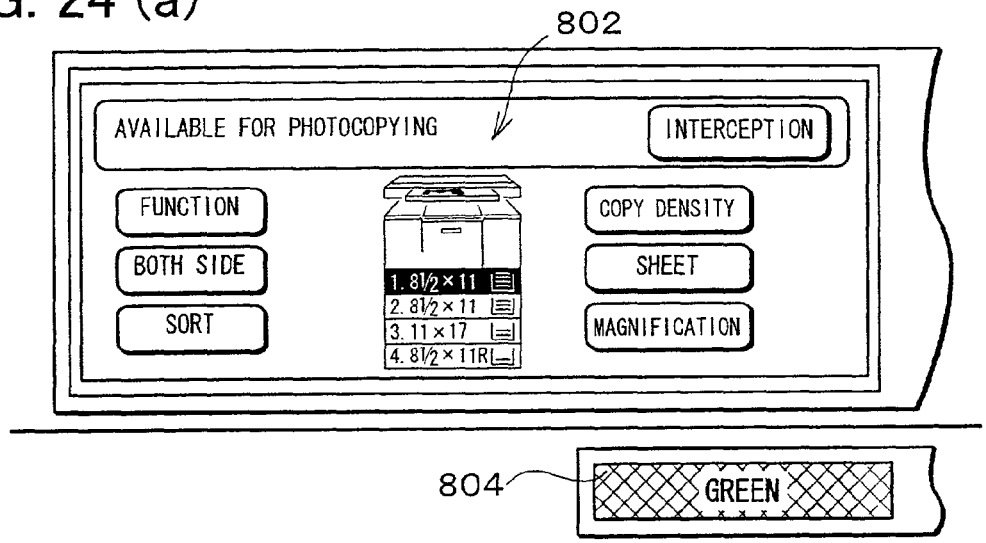
FIGS. 24(*a*) to 24(*c*) are explanatory views showing examples of display formats of the information display section viewed from the position of the user when the user stands operating the digital photocopying machine.
Figure 24:
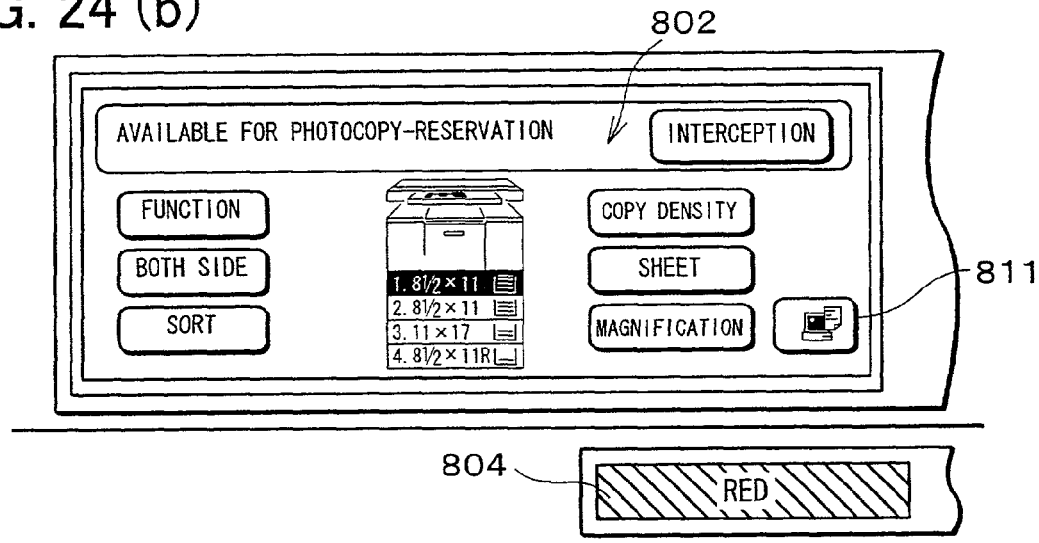
Figure 24:
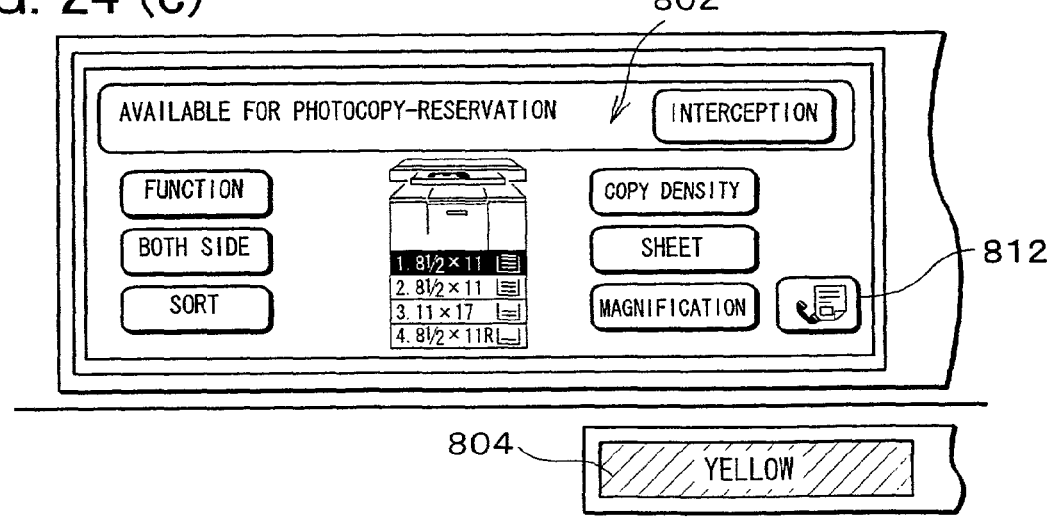

Moreover, shown in FIGS. 24(a) to 24(c) are another concrete examples of the colored information of the printer display section 804. Again, FIGS. 24(a) to 24(c) show the positional arrangement of the scanner display section 802 and the printer display section 804, which are viewed by the users from the direction of the arrow A shown in FIG. 21.

For example, in case the printer 805 is not operated, the color of the back light of the printer display section 804 is set to be the green color as shown in FIG. 24(a). Meanwhile, for example, when the printer 805 is processing (printing) an image data from the personal computer (hereinafter, denoted as a PC) or the like, the color of the back light is changed to the red color, as shown in FIG. 24(b). Further, if the printer 805 is processing (fax reception) an image data received by fax, the color of the back light is changed to the yellow color, as shown in FIG. 24(c).

As discussed above, the colored information on the printer display section 804 enables the user to check the operation state of the printer 805, even if the user focuses on the information in characters and/or by the image, which is displayed on the scanner display section 802. The user can notice the change in the color of the printer display section 804 to check the operation state of the printer 805.

Moreover, it may be so arranged to display, in a part of the scanner display section 802, a character, a symbol, or a design (hereinafter, just referred to as an information icon) to describe the operation state of the printer 805, in case trouble, such as the "paper jamming" or "running out of sheets", is caused in the printer 805, besides the colored information of the printer display section 804. However, it is an object of the digital photocopying machine 801 of the third embodiment to avoid to make a significant change in the display of the scanner display section 802 when the printer 85 has trouble. Therefore, the information icon is displayed in such a size that the information icon can be displayed in a blank display region (that is, a region not used for a display regarding the scanner) of the scanner display section 802.

For example, as shown in FIGS. 23(b) and 23(c), it is possible to display information icons 809 and 810 in a right-bottom corner of the scanner display section 802 so that the information icons 809 and 810 describe the operation states of the printer 805.

Note that, the information icon 809 shown in FIG. 23(b) is an icon for indicating the "paper jamming", while the information icon 810 shown in FIG. 23(c), which is displayed in an identical position in the scanner display section 802 as the information icon 809 in FIG. 23(b), is an information icon for indicating the "running out of sheets". In this manner, the user can notice the occurrence of the trouble by the colored information when the trouble is caused in the printer 805, even if the user focuses on the information in characters and/or by image, which is displayed on the scanner display section 802. Further, the user can check details of the trouble caused in the printer 805, from the information icons 809 and 810 of the scanner display section 802.

Here, it is preferable that the information icon is displayed in a region of the scanner display section 802, which is next to the printer display 804. In this manner, the user can easily check the state of the whole apparatus, while fixing his eyes on a certain region. For example, in FIGS. 23(b) and 23(c), the printer display section 804 is located in the right-bottom corner of the scanner display section 802, so that the information icons 809 and 810 have a position closest to the printer display section 804.

If the information icons 809 and 810 are located in such a position not next to the printer display section 804, the printer display section 804 and the information icons are distanced from each other to some extent. In other words, the user should turn his eyes from the place of the information icons 809 and 810 to the place of the printer display section 804, or vice versa, in order to refer to the information icons 809 and 810 and the information on the printer display section 804, together.

Moreover, it may be so arranged that pushing the information icon 809 or 810 lets the scanner display section 802 to display detailed information on the operation state of the printer 805 or instructions how to solve the trouble, if the user wishes to check details of the information indicated by the information icons while watching the scanner display section 802.

Furthermore, another examples of the information icons are illustrated in FIGS. 24(a) to 24(c). For example, FIG. 24(a) shows a case where no process is carried out in the printer 805, thus no information icon is shown here. On the contrary, an information icon 811 shown in the scanner display section 802 in FIG. 24(b) indicates that the printer 805 is processing the image data from a PC, for example. In FIG. 24(c), an information icon 812 indicates the printer 805 is processing the image data received by fax.

This makes it possible to notify the user of the operation state of the printer 805 without affecting operation instructions for the scanner 803, in case of the system where the scanner 803 and the printer 805 are operated at the same time. Thus, the processes, including a newly-instructed process, are carried out in a simple and efficient manner.

In addition, it may be so arranged that the colored information and the information icon are displayed together and changed in a synchronizing manner. Here, in order that the colored information and the information icon are "changed in the synchronizing manner", for example, in FIG. 23(b), the information icon 809 and the red color of the printer display section 804 are blinked together, when the "paper jamming" is caused in the printer 805.

As discussed above, by displaying the colored information and the information icon together and changing them in the synchronizing manner, the information icon regarding the printer 805 displayed on the scanner display section 802 is explicitly corresponded to the colored information regarding the operation state of the printer 805 displayed on the printer display section 804. This makes it easier for the user to see and check the operation state of the printer 805, while watching the scanner display section 802.

As discussed above, in the image forming system of the third embodiment, the display sections of the printer and the scanner seem to be at least partly next to each other with respect to a direction from which the user is expected to view the display sections.

Moreover, it is possible to arrange the image forming system of the third embodiment as follows. In the image forming system, including an image forming section (for example, a printer) and a function section (for example, a scanner), which are respectively independent units, and which are so mounted that the function section is above the image forming section, the image forming section including a first information display section, the function section including a second information display section, the first and second information display section seem to be at least partly next to each other with respect to a direction from which the user of the image forming system is expected to view the display sections.

With the above arrangement, for the user (operator), who stands carrying out the usual operation, the first and the second information display section seem to be next to each other, thereby allowing the user to fix his eyes in a certain range, so as to easily confirm a state of the whole system.

Furthermore, in addition to the above arrangement, it is preferable for the image forming system that information (colored information) indicated by a change in a color is displayed on the first information display section of the image forming section, when an operation state of the printer is changed.

With the above arrangement, even if the operation state of the image forming section is changed when the user is operating the image forming system while looking at the information in characters and/or by image displayed on the second information display section, the user is notified of the change in the operation state by the colored information on the first information display section.

The colored information can be easily noticed within the range of the view of the user who looks at the second information display section. Therefore, it is possible to easily notify the user of the state of the whole system without significantly changing the display on the second information display section.

Furthermore, it is preferable for the image forming system that information (for example, the information icon) of an operation state of the image forming section indicated by a character, a mark or a design is displayed on a part of the second information display section, when an operation state of the image forming section is changed.

With the above arrangement, even if the user fixes his eyes on the information in characters and/or by image displayed on the second information display section, the user will not be confused and can confirm the operation state of the image forming section because the information icon is displayed for indicating the operation state of the image forming section.

Furthermore, it is preferable for the image forming system that, when the operation state of the image forming section is changed, changed in a synchronizing manner are (a) the information of the operation state of the image forming section indicated by the character, the mark or the design, displayed on the second information display section, and (b) the information indicated by the change in the color displayed on the first information display section.

With the above arrangement, the relationship between the information of the first information display section and that of the second information display section are presented to the user in a more understandable form, thereby allowing the user to more easily confirm the state of the whole system. In other words, more clearly shown is how (a) the information of the operation state of the image forming section indicated by the character, the mark or the design, displayed on the second information display section, and (b) the information indicated by the change in the color displayed on the first information display section, relate to each other. Therefore, it becomes easier for the user to see and check the operation state of the image forming section, while focusing on the second information display section.

[Fourth Embodiment]

The image forming systems of the first to third embodiment can be provided as a digital composite machine having the photocopying function and the fax function. A possible arrangement for such digital composite machine is provided with a first controller for controlling an operation of the photocopying function, and a second controller for controlling an operation of the fax function.

More specifically, when the photocopying function for reproducing a document image on a sheet is performed, the first controller is used to control the scanner and the printer, meanwhile the second controller is used to control the scanner and the printer via the first controller when the fax function for reading a transmitted document or forming an image of the received document is performed.

Figure 25:
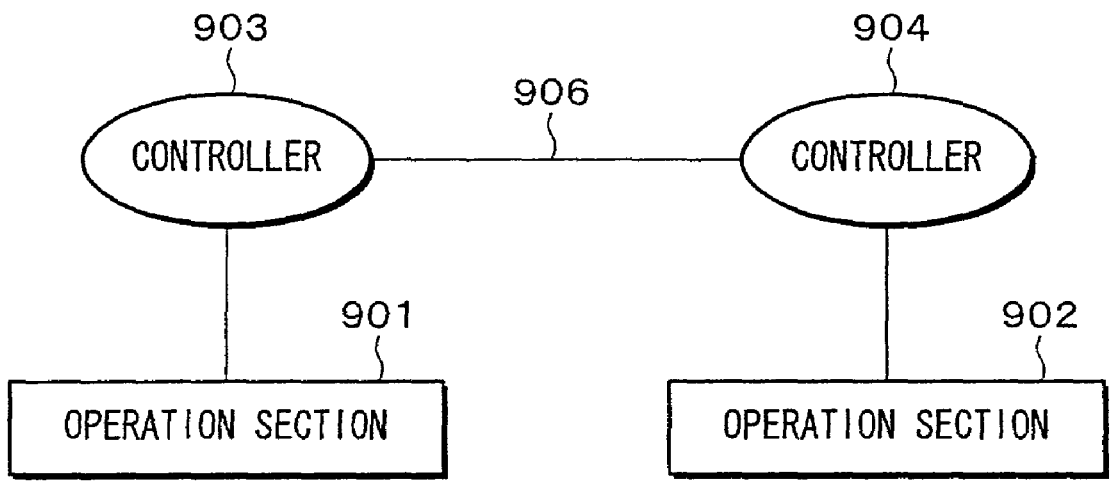
FIGS. 25(*a*) and 25(*b*) are explanatory views of a controller and an operation section in a general digital photocopying machine, in which a scanner and a printer are respectively controlled by different controllers.
Figure 25:
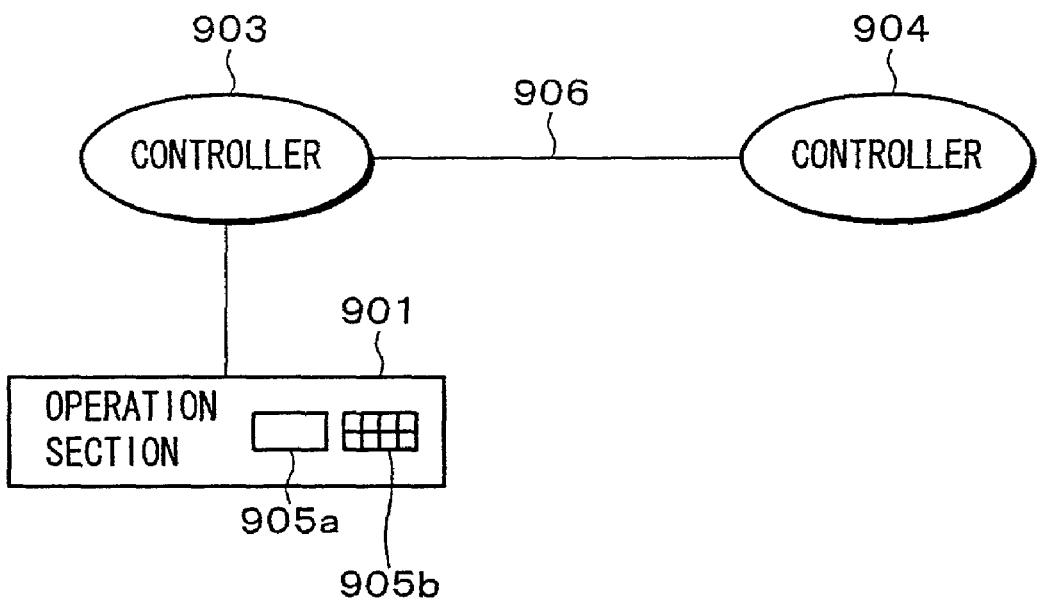

Further, the digital composite machine having the two controllers may have an arrangement shown in FIG. 25(*a*) or an arrangement shown in FIG. 25(*b*). In the arrangement shown in FIG. 25(*a*), the controllers 903 and 904 are respectively provided with an operation section 901 or 902, individually. The operation sections 901 and 902 are provided with a display and key switch. In the arrangement shown in FIG. 25(*b*), the two controllers 903 and 904 share a single operation section 905.

In case the two controllers 903 and 904 share the single operation section 905, the operation section 905, which is connected to the first controller 903 for controlling the photocopying function, is used for performing the fax function, which is controlled by the second controller 904.

In this case, a display data prepared by the second controller 904 is supplied to a display 905*a* in the operation section 905 through a bus line 906, and via the first controller 903. Moreover, an operation data of the key switch 905*b* in the operation section 905 is inputted, via the first controller 903 and through the bus line 906, into the second controller 904. Here, the first controller 903 does not concern with contents of the data communicated between the second controller 904 and the operation section 905.

On the other hand, the digital composite machine uses the printer to output the received image when the fax function is performed. The output process, that is, the image forming process is similar to the image forming process of the photocopying function. Therefore, it is possible that a same kind of error is caused for the photocopying function or the fax function, for example, paper jamming when sheets are conveyed.

In this case, a message for informing occurrence of an error or a message for asking for solving the error is displayed on a display. For the arrangement in which each controller has one operation section, individually, as shown in FIG. 25(*a*), the message is displayed on the first operation section 901 connected to the first controller 903 when the fax function is performed. Meanwhile, the second operation section 902 connected to the second controller 904 is used to display the message when the fax function is performed.

On the other hand, the digital composite machine in which the first and second controller 903 and 904 share the single operation section 905, as shown in FIG. 25(b), the whole process of the fax function is controlled by the second controller 904, independently from the first controller 903 which controls the process of the photocopying function.

For this reason, the first and the second controller are respectively installed with a same program for performing error display, in order that the error displays for the photocopying function and the fax function have a same content.

However, the programs respectively installed in the first and the second controller 903 and 904 may be written in different program languages, depending on, for example, which functional characteristics the programs have, how the programs are developed and which kind of a specification the bus line has. In this case, it is difficult the design the programs to have the error display for the photocopying function and that for the fax function, which have the same content.

Figure 26:
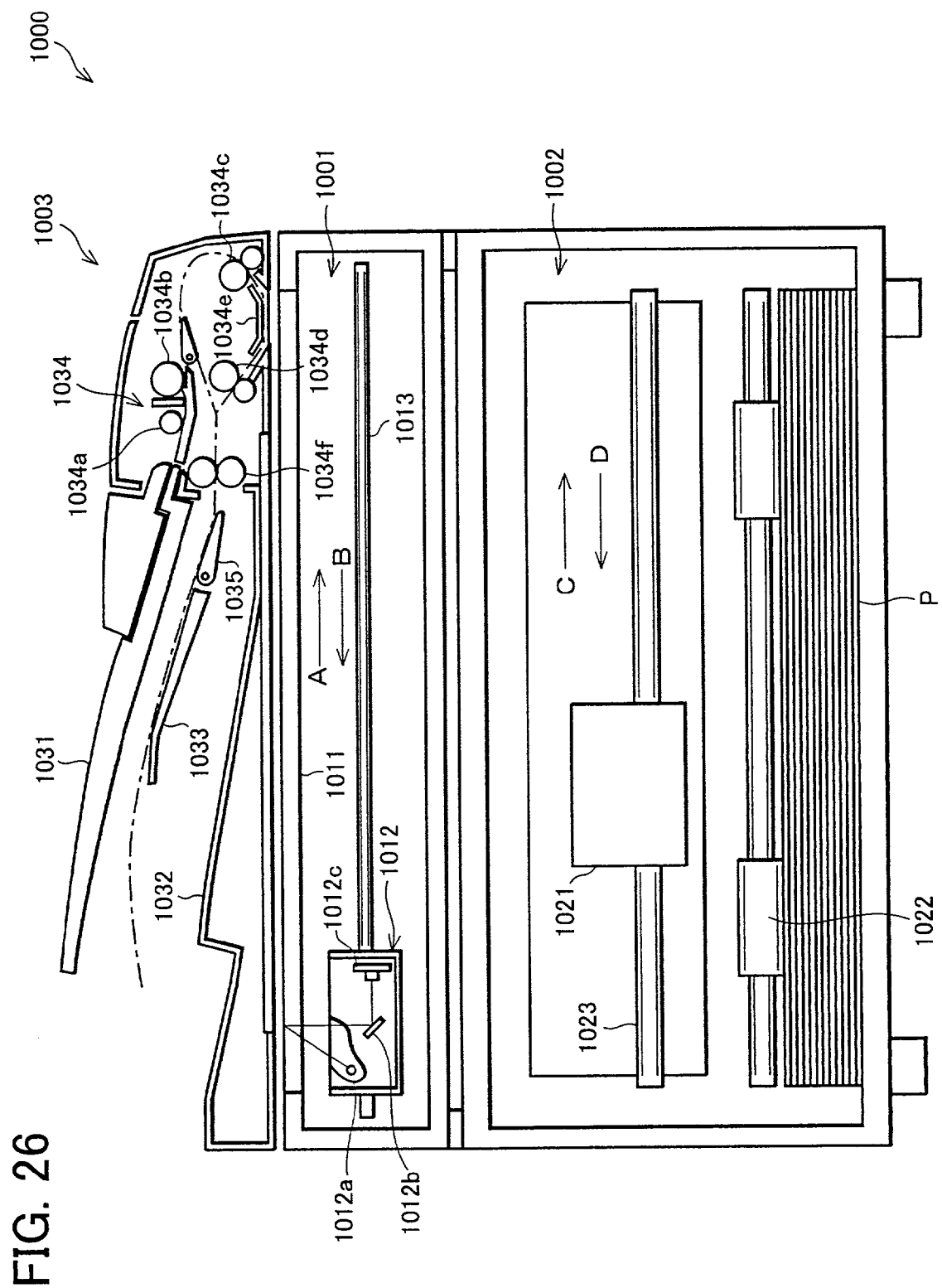
FIG. 26 is a sectional view showing a digital composite machine in which a control method of a fourth embodiment of the present invention is employed.

FIG. 26 is a view illustrating a digital composite machine using a control method of the fourth embodiment of the present invention.

A digital composite machine 1000 is provided with a printer 1002, and a scanner 1001, and a document feeder 1003. The scanner 1001 is located above the printer 1002, and the document feeder 1003 is placed above the scanner 1001. The digital composite machine 1000 has at least the photocopying function for reproducing the document image on the sheet, and the fax function for transmitting/receiving the image data to/from an external fax machine. Furthermore, the digital composite machine 1000 has a PC scanning function for supplying the image data to an external personal computer connected thereto via a data transmission line, and a PC printer function for forming on sheets the image data, which is inputted from the external personal computer.

The digital composite machine 1000 uses the scanner 1001 and the printer 1002 for performing the photocopying function, while using the document feeder 1003 optionally. Moreover, the digital composite machine 1000 uses the document feeder 1003 and the scanner 1001 for performing the fax function as to the transmission. For the reception of the fax function, the digital composite machine 1000 uses the printer 1002. Moreover, the digital composite machine 1000 uses the document feeder 1003 and the scanner 1001 for performing the PC scanning function, while the printer 1002 is used when the PC printer function is performed by the digital composite machine 1000.

Provided to a top of the scanner 1001 is a document platform (platen glass) 1011. Inside the scanner 1001, provided is a scanner unit 1012. The scanner unit 1012 is provided with a light source 1012a, a mirror 1012b and a Charge Coupled Device (CCD) 1012c. The scanner unit 1012 moves back and forth, that is, to direction of an arrow A and to direction of an arrow B, along a guide shaft 1013, parallel with a bottom surface of the document platform 1011.

Moreover, the scanner unit 1012 carries out scanning for exposure with respect to a image surface (a surface on which the image is) of the document, which is placed on the document platform 1011, by using light from the light source 1012a. The CCD 1012c reads reflected light from the image surface of the document by using a mirror 1012b. The CCD 1012c outputs an electric signal (output signal) in accordance with an amount of the reflected light received by a light-receiving surface thereof. The output signal of the CCD 1012c is subjected to a predetermined image process by an image processing section (not shown), then is temprally stored as an image data in a memory.

A carriage 1021 and a conveying roller 1022 are provided inside the printer 1002. The carriage 1021, which is provided with an ink head and an ink tank, moves back and forth, that is, in a direction indicated by an arrow C and a direction indicated by an arrow D, along a guide shaft 1023. The directions C and D are main scanning directions. The conveying roller 1022 conveys sheets P, in a sheet-by-sheet manner, in sub scanning directions, where the sub scanning directions cross the main scanning directions with respect to a position opposed to a bottom surface of the carriage 1021. The sheets P are stored in such a manner that the a plurality of the sheets P are piled up. Then, while the carriage 1021 moves in both of or either of the directions indicated by the arrows C and D, a driving signal, which is in accordance with the image data, is supplied from the image processing section to the ink head, so that the ink head discharges an ink onto a surface of the sheets P so as to form the image.

Figure 27:
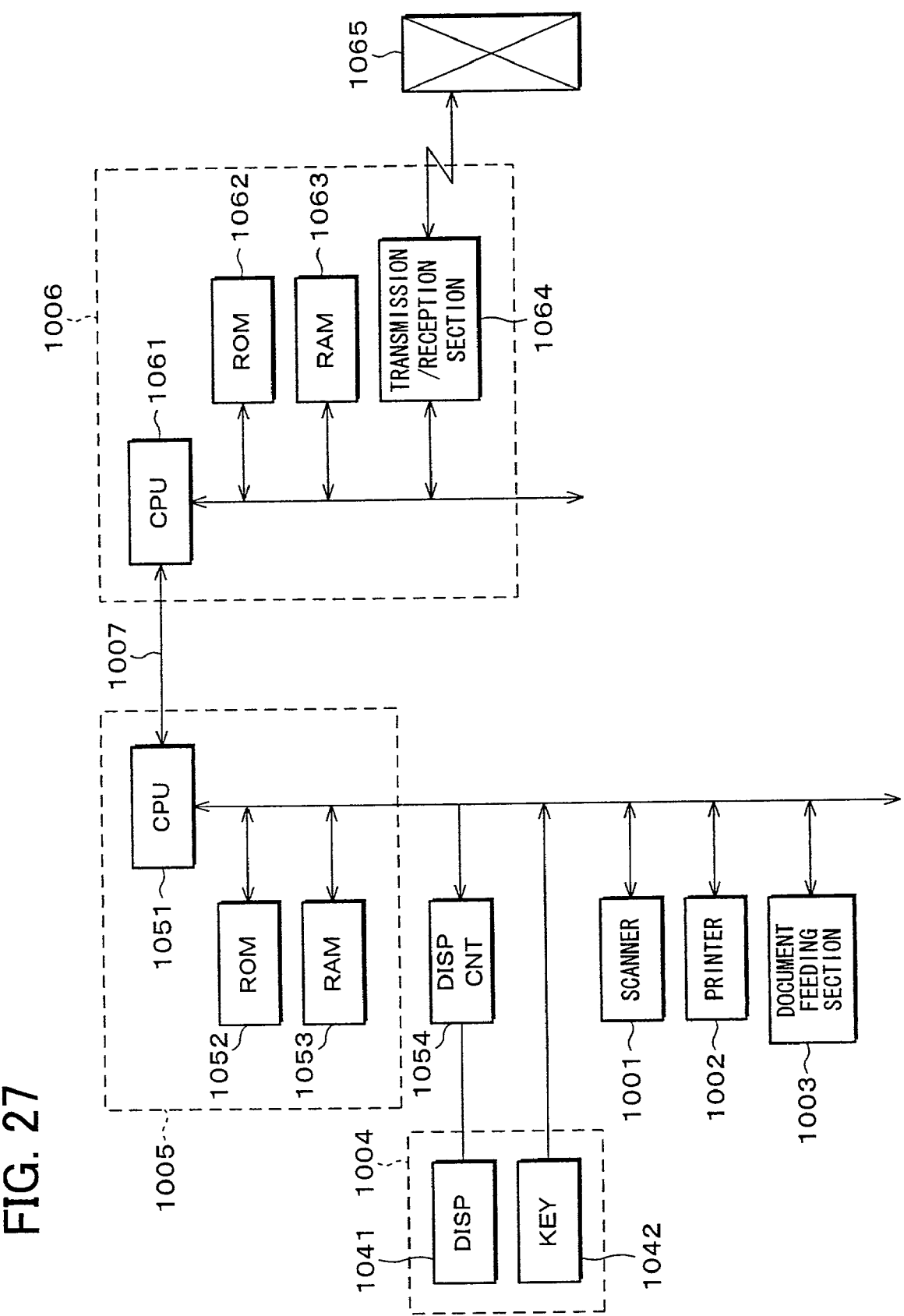
FIG. 27 is a block diagram of a control section of the digital composite machine.

Note that the printer 1002 is provided with an operation section 1004 (see FIG. 27), on a front side thereof. The operation section 1004 is provided with a display section 1041 and a key switch 1042, as shown in FIG. 27. The display section 1041 displays a display data, which is in accordance with operation states of respective sections of the digital composite machine 1000. The key switch 1042 accepts an input operation by an operator, which regards selection of function, or setting of operation conditions.

The document feeder 1003 is provided with a document tray 1031, a delivery-out tray 1032, a reversing tray 1033, and a supplying unit 1034. The supplying unit 1034 is provided with a rubbing roller 1034a, a draw-out roller 1034b, supplying rollers 1034c and 1034d, a platen board 1034e, and delivery-out rollers 1034f. The supplying unit 1034 supplies, in the sheet-by-sheet manner, a plurality of documents placed on the document tray 1031 to the delivery out tray 1032 or the reversing tray 1033, passing the documents between the platen board 1034e and the document platform 1011. On a side of the reversing tray 1033, which is closer to the supplying unit 1034, provided is a flapper 1035, which can freely flap.

In case of the document feeder 1003 is in a one-side document mode, and when the document feeder 1003 is feeding documents for processing a reverse side of the documents in case of its both-side document mode, the flapper 1035 flips to open a way between the delivery-out rollers 1034f and the delivery-out tray 1032, so as to guide the document, which has passed between the platen board 1034e and the document platform 1011, to the delivery-out tray 1032. Meanwhile, when the document feeder 1003 is feeding documents for processing a top side of the document in case of its both-side document mode, the flapper 1035 flips to close the way between the delivery-out rollers 1034f and the delivery-out tray 1032, so as to guide the document, which has passed between the platen board 1034e and the document platform 1011, to the reversing tray 1033.

When the document feeder 1003 is feeding the documents for processing the top side of the documents in case of its both-side document mode, the delivery-out rollers 1034f revolve reversely while holding a part of the document therebetween, so that the up-side-down document is supplied between the platen board 1034 and the document platform 1011, again.

Note that the scanner unit 1012 is stationed at far-right side of its moving range, when the document feeder 1003 is used for reading the document image for performing the photocopying function, the fax transmission of the fax function, or the PC scanning function. Here, the light from the light source 1012*a* is projected onto the bottom surface of the platen board 1034*e* via the document platform 1011. Moreover, the document feeder 1003 is so installed that the document feeder 1003 can be opened and closed on the scanner 1001, where a back side of the document feeder 1003 is hinged on that of the scanner 1001. In this manner, a single sheet of the document or a thick document can be placed manually on the top of the document platform 1011, when the photocopying function or the PC scanning function is performed.

FIG. 27 is a block diagram illustrating a control section of the digital composite machine. The control section of the digital composite machine 1000 is provided with a main controller 1005 (a first controller) and a sub-controller 1006 (a second controller), which are connected with each other via a bus line 1007.

The main controller 1005 is provided with a CPU 1051, which includes ROMs 1052 and 1053. The CPU 1051 is connected with input/output apparatuses of the scanner 1001, the printer 1002, the document feeder 1003, and the operation section 1004. Especially, a display section 1041 of the operation section 1004 is connected to a CPU 1051 via a driver 1054. The driver 1054 drives the display section 1041 in accordance with a display data supplied from the CPU 1051. Moreover, the operation section 1004 has a key switch 1042, which inputs into the CPU 1051 an operation data, which is in accordance with operation by the operator.

The main controller 1005 controls operation states of the respective input/output apparatuses when the photocopying function, PC scanning function, or PC printer function is performed. For example, in order to perform the photocopying function, the main controller 1005 when photocopying conditions are set by operating the key switch 1042, operates the scanner 1001, the printer 1002, and the document feeder 1003, in accordance with the inputted photocopying conditions. In this way, the documents set on the document tray 1031 are fed in the sheet-by-sheet manner so that the images are read, so as to form the images on the sheets P in accordance with the image data, which has been read. Here, the main controller 1005 prepares a display data in accordance with the operation state of the photocopying function performed, so as to display, on the display section 1041 via the driver 1054, a message according to the operation state.

On the other hand, the sub-controller 1006 is provided with a CPU 1061, which has ROMs 1062 and 1063. The CPU 1061 is connected with a transmission/reception section 1064.

In principle, the sub-controller 1006 controls the operations states of the respective input/output apparatuses when the fax function is performed. More specifically, when the transmission of the fax function is to be performed, the sub-controller 1006 is in a standby state and ready for the input of setting of transmission conditions for the transmission (such as telephone number of the transmission destination) by operating the key switch 1042. In accordance with the inputted transmission conditions, the sub-controller 1006 operates the scanner 1001, the document feeder 1003 and the transmission/reception section 1064. Because of this operation, the digital fax machine feeds, in the sheet-by-sheet manner, the documents set on the document tray 1031, and reads the image of the documents, while the digital fax machine calls the transmission destination via a public telephone line network, so that the image data is transmitted to a fax machine of the transmission destination.

Moreover, when the fax reception is carried out, the sub-controller 1006 temporally stores, in the RAM 1063, an image data received by the transmission/reception section 1064, then operates the printer 1002 so as to form an image on the sheet P in accordance with the received image data. Further, the sub-controller 1006 prepares a display data, which is in accordance with the operation state of the photocopying function, and displays the display message on the display section 1041 via the driver 1054.

Note that, when the fax function is operated, the scanner 1001, the printer 1002, the document feeder 1003, and the operation section 1004 are operated according to an operation data, which is prepared by the main controller 1005 in accordance with operation instructions outputted from the sub-controller 1006.

In principle, the display operation of the operation section 1004 for the fax function is carried out by supplying the display data, which is prepared by the sub-controller 1006, to the driver 1054 via the main controller 1005. However, a display data prepared by the main controller 1005 is supplied to the driver 1054, in case of a predetermined operation state of the fax function.

In addition, when the fax function is performed using the sub-controller 1006, it is possible to perform, at the same time, the PC scanner function or the PC print function, in which the main controller 1005 is used.

For example, during the fax transmission, when the printer 1002 is not used, it is possible to operate the printer 1002 by the main controller 1005 in accordance with an image data inputted from an external personal computer or the scanner 1001, so as to perform the image forming process.

Moreover, because the scanner 1001 and the document feeder 1003 are not used during the fax reception, it is possible that the main controller 1005 operates the scanner 1001 and the document feeder 1003 so as to read an image data, which is to be outputted to the external personal computer or the scanner 1001.

Figure 28:
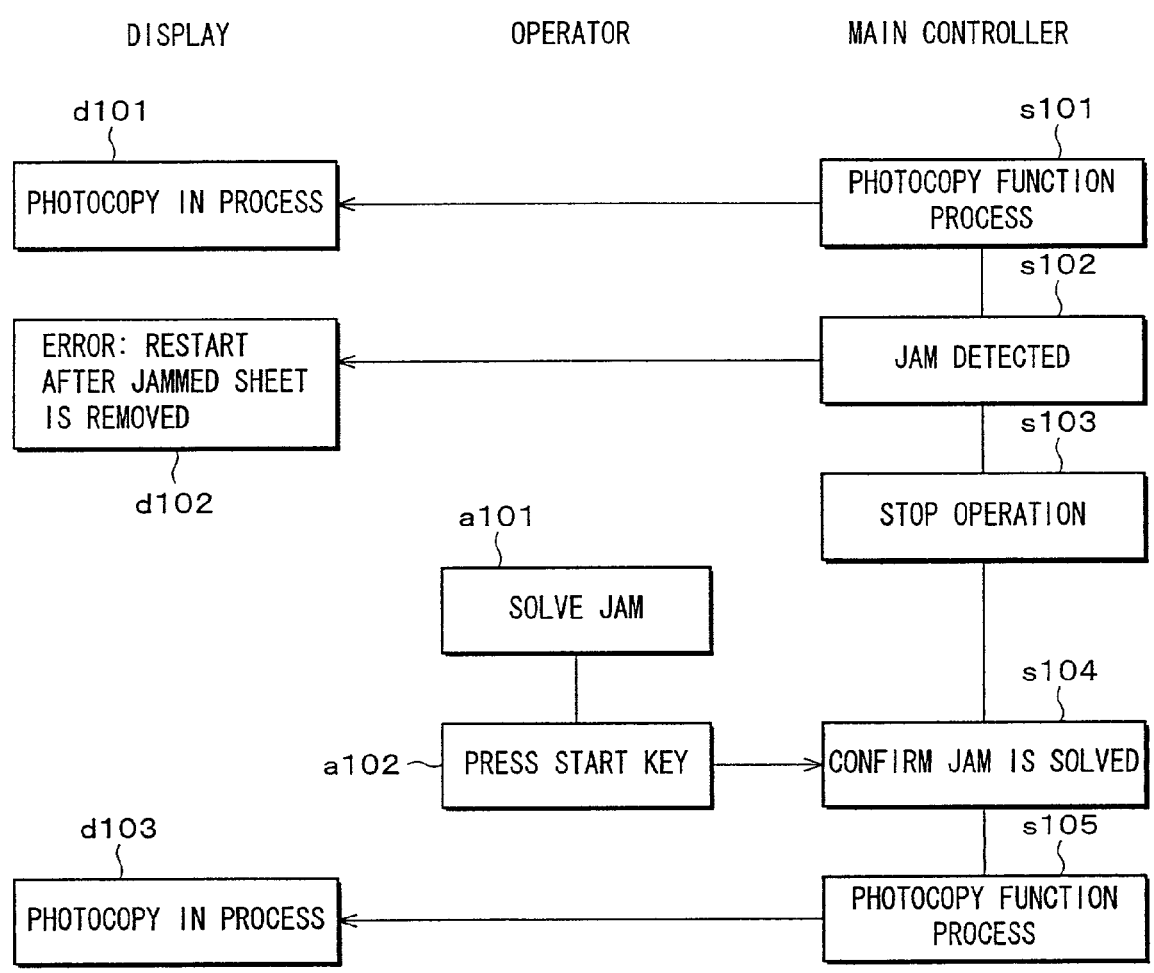
FIG. 28 is an explanatory view showing a relationship between an operation state of the digital composite machine and display content of a display section, when paper is jammed while the digital composite machine functions as a photocopying machine.
Figure 29:
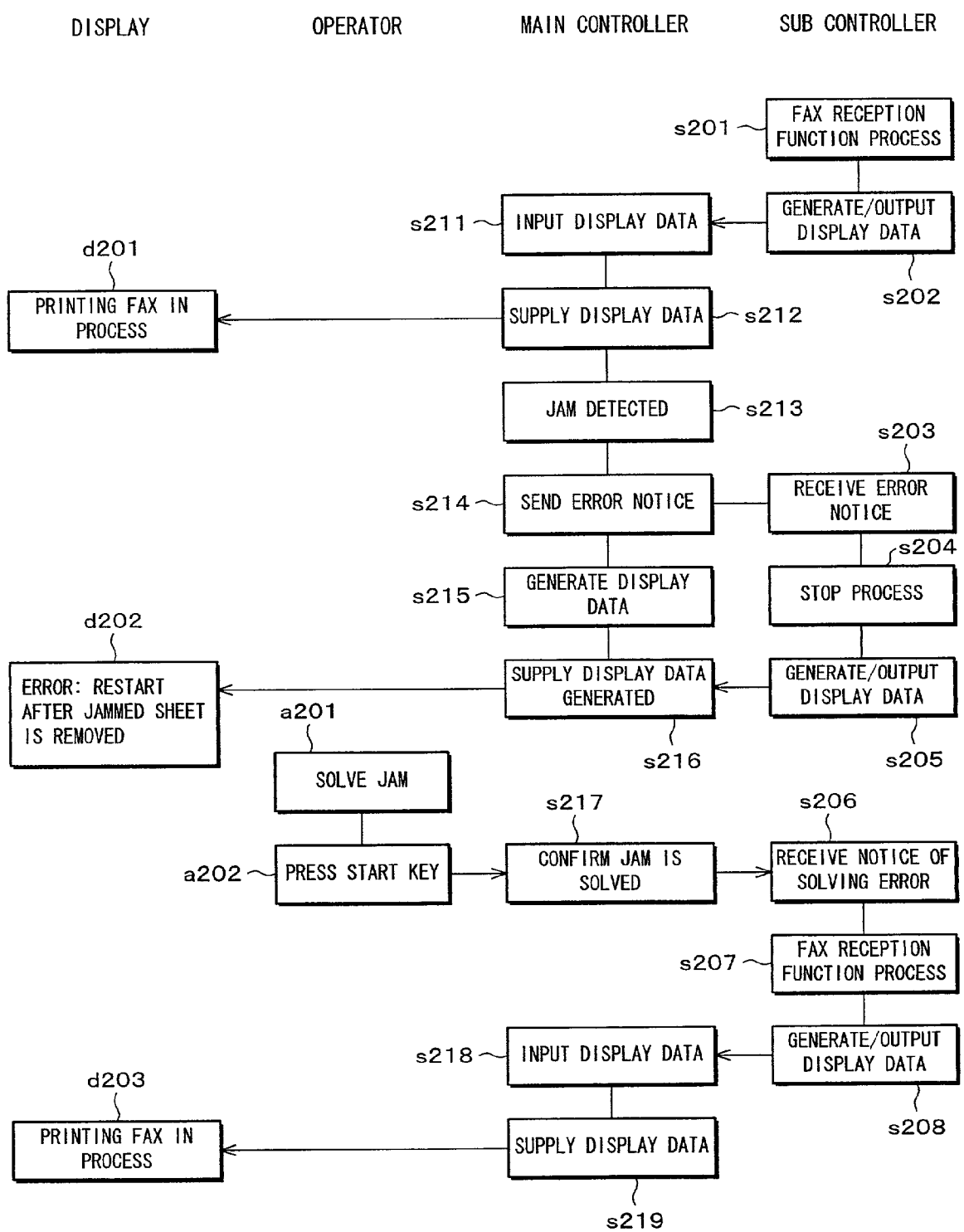
FIG. 29 is an explanatory view illustrating a relationship between an operation state of the digital composite machine and display content of the display section, when paper is jammed when the digital composite machine functions as a facsimile receiver.
Figure 30:
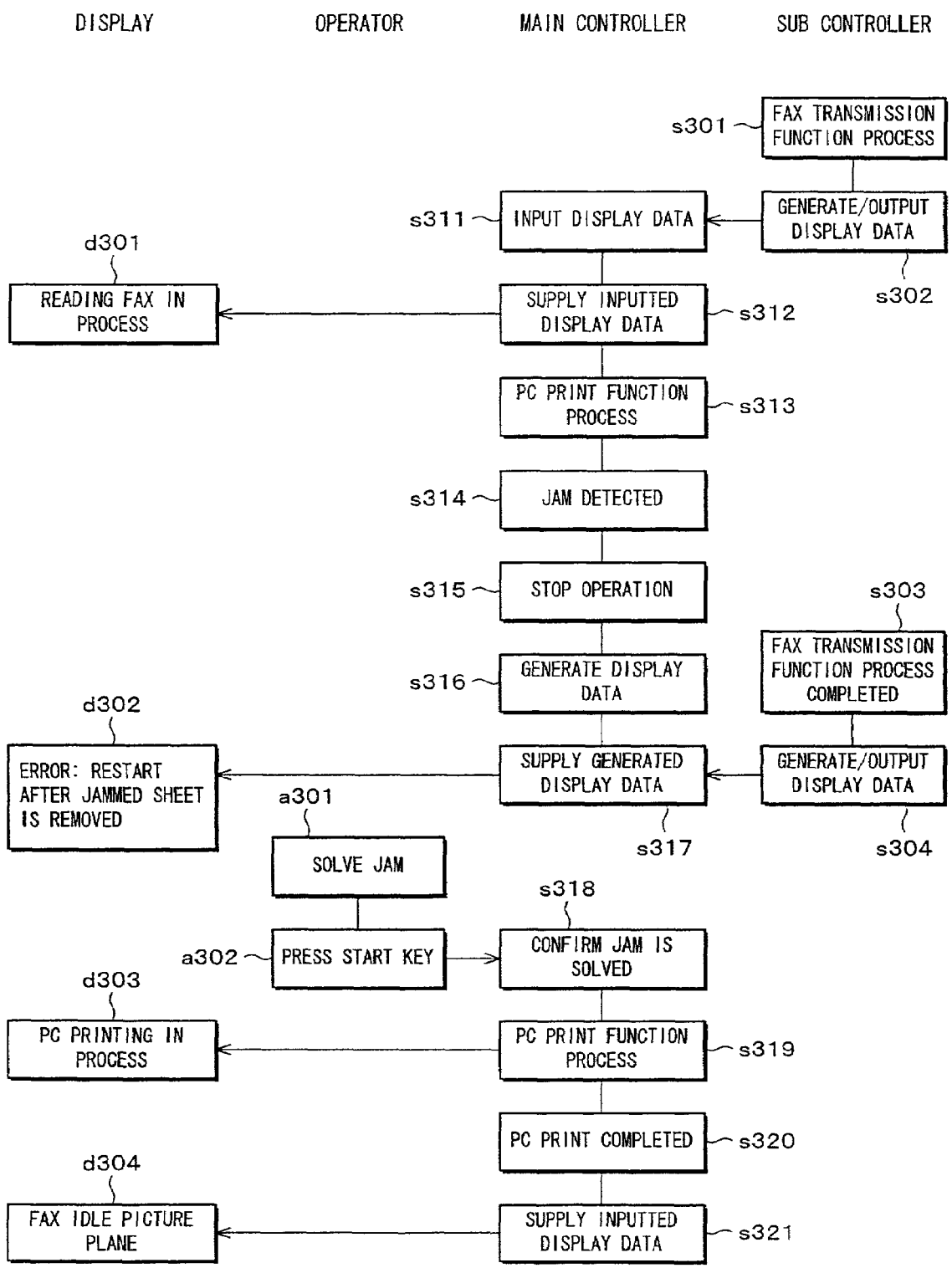
FIG. 30 is an explanatory view showing a relationship between an operation state of the digital composite machine and display content of the display section, when paper is jammed while the digital composite machine functions as a fax transmitter and a PC printer at once.

FIGS. 28 to 30 are views illustrating a relationship between the operation state of the digital composite machine and the display content of the display section. FIG. 28 shows the relationship between the operation state of the digital composite machine and the display content of the display section, when the sheet is jammed while the photocopying function is performed.

When the digital composite machine 1000 performs the photocopying function, the main controller 1005 controls the operation of the scanner 1001, the printer 1002, the document feeder 1003 and the operation section 1004. In other words, while the scanner 1001, the printer 1002, and the document feeder 1003 are operated for the photocopying function (s101), the display section 1041 of the operation section 1004 displays a message to inform that the photocopying is in process in accordance with the display data prepared by the main controller 1005 (d101).

When the sheet P is jammed in the printer 1002 during the operation of the photocopying function (s102), the main controller 1005 detects the jamming, and stops the operation of the scanner 1001, the printer 1002, and the document feeder 1003 (s103). Meanwhile, the main controller 1005 prepares a display data of the error message and supplies the display data to the display section 1041. In this manner, the display section 1041 displays a message for asking to solve the jamming (d102).

When the operator presses a start key on the operation section 1004 after solving the jamming (a101, a102), the main controller 1005 restarts the process of the photocopying function, after confirming the jamming is solved, then supplies to the display section 1041 the display data of the message to inform that the photocopying is in process (s104, s105). This restarts the scanner 1001, the printer 1002, and the document feeder 1003 to operate for performing the photocopying function, while the display section 1041 displays the message to inform that the photocopying is in process (d103).

FIG. 29 illustrates a relationship between the operation state of the digital composite machine and the display content of the display, when jamming is caused during the fax reception.

When the digital composite machine 1000 performs the fax reception, the sub-controller 1006 controls the operation of the printer 1002 and the operation section 1004 via the main controller 1005. Specifically, while the printer 1002 is operated for the fax reception (s201), the sub-controller 1006 prepares a display data for a message to inform that the printing of the received image is in process and outputs the display data to the main controller 1005 (s202).

The display data is supplied to the display section 1041 of the operation section 1004 from the main controller 1005 (s211, s212), so that the display section 1041 displays the message that the printing of the received image is in process (d201).

When the main controller 1005 detects that the sheet P is jammed in the printer 1002 while the fax reception is performed (s213), the main controller 1005, which detects the jamming, notifies the sub-controller 1006 of the occurrence of error (sends an error notice) (s214), while the main controller 1005 prepares (generates) a display data of the error message (s215). When the sub-controller 1006 is notified of the occurrence of error (s203), the sub-controller 1006 stops the printer 1002 operating (s204), meanwhile the sub-controller 1006 prepares a display data for an idle picture plane while the system is on standby, and outputs the display data to the main controller 1005 (s205).

Here, in accordance with a priority order between (a) the display data of the idle picture plane inputted from the sub-controller 1006 and (b) the display data of the error message prepared by the main controller 1005, the display data of the error message is supplied to the display section 1041 by the main controller 1005 (s216). In this way, the display section 1041 displays the message for asking to solve the jamming (d202).

When the operator presses the starter key on the operation section 1004 after the jamming is solved (a201, a202), the main controller 1005 notifies the sub-controller 1006 after confirming that the jamming is solved (s217). When the sub-controller 1006 is notified that the error is solved (s206), the sub-controller 1006 restarts the process of the fax reception (s207), while the sub-controller 1006 prepares the display data of the message to inform that the printing of the received image is in process, and outputs the display data to the main controller 1005 (s208).

The display data is supplied to the display section 1041 of the operation section 1004 from the main controller 1005 (s218, s219). This restarts the printer 1002 to perform the fax reception, while the display section 1041 displays the message to inform that the printing of the received image is in process (d203).

In the above manner, the error message prepared by the main controller 1005 in accordance with the display data is displayed on the display section 1041 when the sheet P is jammed in the printer 1002 during the fax reception in which the operation of the printer 1002 is mainly controlled by the sub-controller 1006. The error message is identical with the error message displayed when jamming is caused during the performance of the photocopying function.

Therefore, it is unnecessary for the digital photocopying machine of the fourth embodiment to install in the sub-controller 1006 a processing program for preparing the display data of the error message. Moreover, even if the main controller 1005 and the sub-controller 1006 have different program languages, this makes it easier to display the identical error messages on the display section 1041 in both a case of the photocopying function and a case of the fax function for reception.

In addition, during the process of a202, if the operator presses a key (such as ten keys) other than the start key or a clear key before he presses the start key, data of the operation (operation data) caused by the pressing is inputted to the sub-controller 1006 from the main controller 1005. The operation data may be indicative of display content of the display section 1041 after the error is solved.

FIG. 30 illustrates a relationship between the operation state of the digital composite machine and the display content of the display section, when jamming is caused while the fax function for transmission and the PC print function are carried out at the same time.

When the digital composite machine 1000 performs the fax transmission, the sub-controller 1006 controls the operation of the scanner 1001 and the operation section 1004, via the main controller 1005. Specifically, while the printer 1002 is operated for the fax transmission (s301), the sub-controller 1006 prepares a display data for a message to inform that the reading of the transmitted image is in process, and outputs the display data to the main controller 1005 (s302). The display data is supplied to the display section 1041 of the operation section 1004 from the main controller 1005 (s311, s312), and the display section 1041 displays the message to inform that the reading of the transmitted image is in process (d301).

When the sub-controller 1006 controls the fax transmission, the printer 1002 is not used. Therefore, it is possible to carry out the image forming process of the other image data at the same time. Here, discussed is an example where the process of the PC print function for an image data inputted from the external apparatus is carried out by the main controller 1005, while the fax function for transmission is carried out by the sub-controller 1006.

If the sheet P is jammed in the printer 1002 while the main controller 1005 is performing the PC print function (s313), the main controller 1005, which detects the jamming, stops the printer 1002 operating (s314, s315). Here, the main controller 1005 does not notify the sub-controller 1006 of the occurrence of error, so that the transmission of the fax function will not be suspended immediately.

Meantime, the main controller 1005 prepares the display data of the error message (s316). However, the main controller 1005 continues to supply, to the display section 1041, the message to inform that the reading of the transmitted image is in process, in accordance with the priority between (a) the display data of the message to indicate the reading of the transmitted image, which is inputted from the sub-controller 1006, is in process, and (b) the display data of the error message prepared by the main controller 1005.

On the other hand, when the process of the fax function for transmission is completed (s303), the sub-controller 1006 prepares the display data of the idle picture plane to inform that the system is on standby, and outputs the display data to the main controller 1005 (s304). Here, the main controller 1005 supplies the display data of the error message to the display section 1041, in accordance with the priority between (a) the display data of the idle picture plane inputted from the sub-controller 1006, and (b) the display data of the error message prepared at s316 (s317). In this way, the display section 1041 displays the message for asking to solve the jamming.

When the operator presses the start key on the operation section 1004 after the jamming is solved (a301, a302), the main controller 1005 confirms that the jamming is solved (s318), then restarts the process of the PC print function (s319). Here, the main controller 1005 prepares a display data for a message to inform that the PC printing is in process, and supplies the thus prepared display data to the display section 1041, in accordance with the priority between the display data of the idle picture plane inputted from the sub-controller 1006, and the display data of the message to indicate that the PC printing is in process. In this way, the printer 1002 is restarted to perform the PC print function, while the display section 1041 displays the message to indicate that the PC printing is in process (d303).

Thereafter, when the PC printing is completed (s320), the main controller 1005 supplies, to the display section 1041, the display data of the idle picture plane inputted from the sub-controller 1006 (s321). In this manner, the display section 1041 displays the idle picture to inform that the system is on standby as to the fax function (d304).

Figure 31:
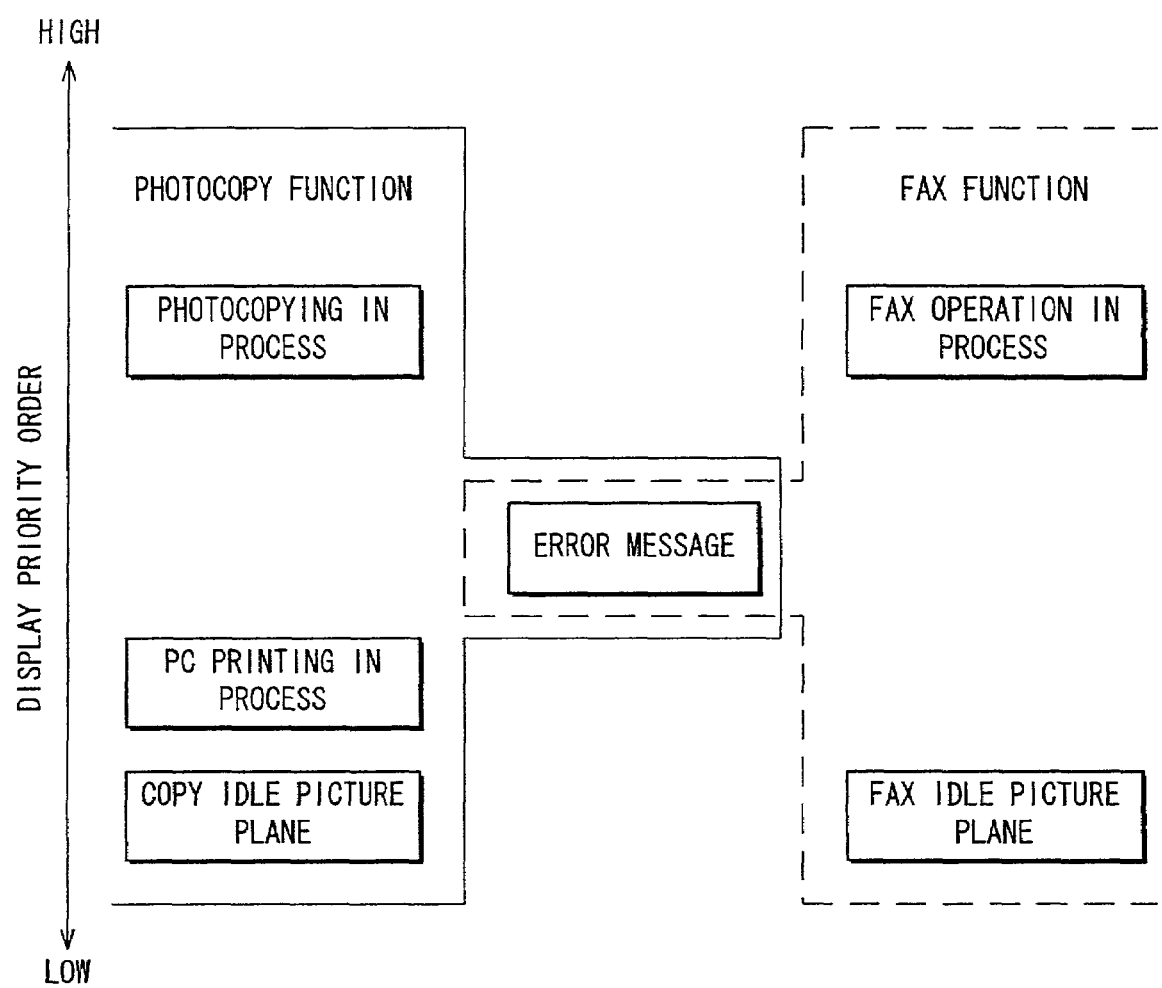
FIG. 31 is an explanatory view illustrating priority order of display data supplied to the display section of the digital composite machine.
Figure 32:
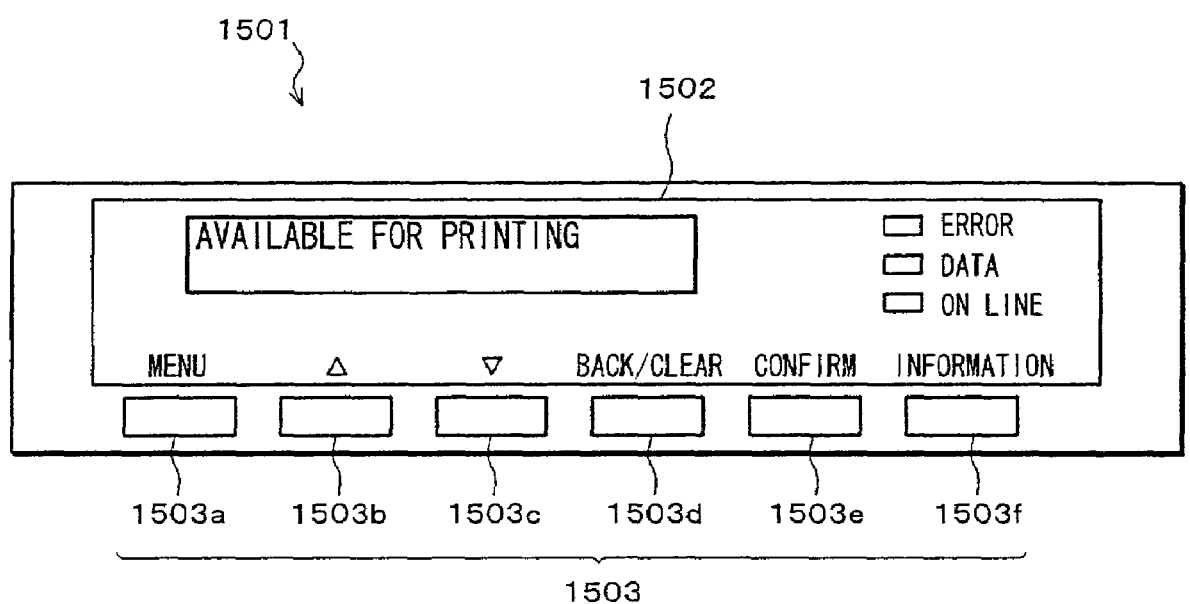
FIG. 32 is an explanatory view illustrating an operation panel for displaying information of a printer in a conventional image forming system.

FIG. 31 is a view illustrating the priority order of the display data supplied to the display section in the digital composite machine. In other words, in the digital composite machine 1000, the respective display picture plane, which are prepared by the main controller 1005 or the sub-controller 1006 and displayed on the display section 1041, have the priority order thereof.

As discussed above, in case the display data prepared by the main controller 1005 and the display data prepared by the sub-controller 1006 exist at the same time, the display data having a higher priority is supplied to the display section 1041 from the main controller 1005.

For example, the display data of the error message prepared by the main controller 1005 has a higher priority than a display data of a fax idle picture plane prepared by the sub-controller 1006 while the fax function is performed. Therefore, in case the printer 1002 causes jamming while the fax function for reception is performed, the display data of the error message prepared by the main controller 1005 is supplied to the display section 1041.

Moreover, a display data of a message to inform that fax transmission is in process (the display data is prepared by the sub-controller while the fax function is performed) has a higher priority than the display data of the error message prepared by the main controller 1005 while the PC print function is performed at the same time of the fax function. Therefore, in case the printer 1002 causes jamming while the fax function for transmission is performed, the display data, which is prepared by the sub-controller 1006, is supplied to the display section 1041, where the display data regards the message to inform that the fax transmission is in process.

In this manner, the display content of the display section 1041 is determined in accordance with the priority order set in advance. As a result, the digital composite machine 1000 of the fourth embodiment can display on the display section 1041 information that should be notified to the operator, even if the main controller 1005 and the sub controller 1006, which control different functions, prepare display data at the same time.

As discussed above, in the image forming system of the fourth embodiment, wherein the printer and the scanner shares one of the display sections thereof for displaying information regarding the whole system when the printer and the scanner are used in combination as the system, the one of the printer and the scanner, which includes the display section shared in case of the formation of the system, comprises a first control section, while the other of the printer and the scanner comprises a second control section, where the first control section and the second control section are connected together via a bus line, so that, when the system is controlled by the second control sections, the first control section prepares a display data in accordance with instructions from the second control section, and supplies the display data to the shared display section, in case the system has a predetermined operation state (for example, an error) that requires display of instructions on the display section.

Alternatively, as to the image forming system of the fourth embodiment, it may be so arranged that a control method of a digital composite machine, in which a first and a second controller are connected with each other via a bus line, the first and the second controller respectively controlling a different function, and the first controller being connected to an operation section including a display section for displaying selectively a plural of display data, which respectively correspond to a plural of operation states, which may occur while the first controller controls the system, or which may occur while the second controller controls the system, the control method includes the steps of preparing a display data by using the first controller, and supplying the display data to the display section, the display data corresponding to a predetermined operation state, when the predetermined operation state is caused while the second controller controls the system during which display data prepared by the second controller should be supplied to the display section via the first controller.

With this arrangement, in case the system causes the predetermined operation state when the second controller controls the system, the first controller prepares the display data, which is in response to the operation state, and displays the display data on the display section. Therefore, the display formats on the display section are identical for when the first controller controls the system and when the second controller controls the system, because the display data prepared by the first controller is displayed on the display section when the second controller controls the system.

Moreover, in the image forming system, the predetermined operation state is common to when the system is controlled by the first controller and when the system is controlled by the second controller.

When the system causes a predetermined operation state between the operation states that may occur while the second controller controls the system, which is common to the operation state that may occur while the first controller controls the system, the first controller prepares a display data, which is in response to the operation state, and the display data is displayed on the display section. Therefor, in case caused is the common operation state, the display data prepared by the first controller is displayed on the display section, so that an identical display is displayed on the display section for when the first controller controls the system, and when the second controller controls the system.

Moreover, in the image forming system, the first controller determines whether or not the operation state is an operation state that requires the display data prepared by the first controller to be displayed, in accordance with the priority order, which is preset for the respective plural display data, which respectively correspond to the operation states that may occur while the second controller controls the system.

With this arrangement, it is judged whether or not the first controller should prepare a display data, in accordance with the priority order, which is preset for the respective plural display data, which respectively correspond to the operation states that may occur while the second controller controls the system. Therefore, in case the predetermined operation state is caused while the second controller controls the system, the display data prepared by the first controller is displayed on the display section only when the display data prepared by the first controller has a higher priority than the display data prepared by the second controller. Thus, when the display data prepared by the first controller has a lower priority than the display data prepared by the second controller, the display data prepared by the second controller is displayed on the display section. Therefore, the second controller can continue to control the system without a sudden suspension.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image forming system, including a printer for forming an image on a recording medium and a scanner for optically reading a document image, where the printer and the scanner are used in a systematic manner in which the printer and the scanner are used in combination as a system, wherein:
    the printer and the scanner respectively comprises a display section, and
    the printer includes a control section for controlling the respective display sections in such a manner that at least one of the display sections has different display formats for a non-systematic manner and for the systematic manner.

2. The image forming system as set forth in claim 1, wherein one of the display sections of the printer and the scanner shows information regarding the whole system, when the printer and the scanner are used in combination as the system.

3. The image forming system as set forth in claim 2, wherein the display section of the scanner is the display section that displays the information regarding the whole system, when the printer and the scanner are used in combination as the system.

4. The image forming system as set forth in claim 2, wherein the display section that displays the information regarding the whole system when the printer and the scanner are used in combination in a system has a larger display screen than the other display section.

5. The image forming system as set forth in claim 1, wherein the scanner includes a large-sized display section, which can display drawings, so that detailed information of the printer can be displayed on the large-sized display section of the scanner, when the printer and the scanner are used in combination as the system.

6. The image forming system as set forth in claim 5, wherein the control section comprises a display information storing section for storing, in advance, display information for display in the large-sized display section, providing for a case where the printer is used in combination with the scanner.

7. The image forming system as set forth in claim 5, wherein display information for displaying the detailed information of the printer on the large-sized display section is installed in the printer when the printer and the scanner are used in combination, where the detailed information can be installed by post-installation.

8. The image forming system as set forth in claim 1, wherein the printer and the scanner respectively include a user interface section composed of the display section and an operation section therein, the image forming system further comprising:
    a detecting section for detecting connection of the printer and the scanner when the printer and the scanner are connected together as the system, or disconnection of the printer and the scanner when the printer and the scanner are disconnected from each other; and
    a control section for inactivating one of the user interfaces section of the printer and the scanner when the detection section detects the connection of the printer and the scanner.

9. The image forming system as set forth in claim 8, wherein the control section inactivates the user interface section of the printer, when the detection section detects the connection of the printer and the scanner.

10. The image forming system as set forth in claim 8, the control section inactivates the user interface section of one of the printer and the scanner that is installed above the other, when the detection section detects the connection of the printer and the scanner.

11. The image forming system as set forth in claim 8, wherein the control section activates a user interface section that has been inactivated until then, when the detection section detects the disconnection of the printer and the scanner.

12. The image forming system as set forth in claim 8, wherein the detection section has a function for detecting whether or not the scanner and the printer are connected as the system, when power is supplied.

13. The image forming system as set forth in claim 8, wherein the one of the printer and the scanner whose user interface section is inactivated when the scanner and the printer is used in combination as the system includes a detailed information display section and a simple information display section, wherein the control section inactivates only the detailed information display section when the user interface section is inactivated.

14. The image forming system as set forth in claim 1, the display sections of the printer and the scanner seem to be at least partly next to each other with respect to a direction from which the user is expected to view the display sections.

15. The image forming system as set forth in claim 14, wherein information indicated by a change in a color is displayed on the display section of the printer, when an operation state of the printer is changed.

16. The image forming system as set forth in claim 15, wherein information of an operation state of the printer indicated by a character, a mark or a design is displayed on a part of the display section of the scanner, when an operation state of the printer is changed.

17. The image forming system as set forth in claim 16, when the operation state of the printer is changed, changed in a synchronizing manner are (a) the information of the operation state of the printer indicated by the character, the mark or the design, displayed on the display section of the scanner, and (b) the information indicated by the change in the color displayed on the display section of the printer.

18. The image forming system as set forth in claim 1, wherein the printer and the scanner shares one of the display sections thereof for displaying information regarding the whole system when the printer and the scanner are used in combination as the system, wherein the one of the printer and the scanner, which includes the display section shared in case of the formation of the system, comprises a first control section, while the other of the printer and the scanner comprises a second control section, where the first control section and the second control section are connected together via a bus line, so that, when the system is controlled by the second control sections, the first control section prepares a display data in accordance with instructions from the second control section, and supplies the display data to the shared display section, in case the system has a predetermined operation state that requires display of instructions on the display section.

19. The image forming system as set forth in claim 18, wherein the predetermined operation state is common to when the system is controlled by the first control section and when the system is controlled by the second control section.

20. The image forming system as set forth in claim 18, wherein there is a preset priority order between a display data prepared by the first control section and a display data prepared by the second control section, so that the first control section selects which of the display data is to be supplied to the shared display section in accordance with the priority order, when the display data of the first control section and that of the second control section are prepared at a same time.

21. An image forming system, including a printer for forming an image on a recording medium and a scanner for optically reading a document image, where the printer and the scanner are operable in a systematic manner in which the printer and the scanner are used in combination as a system, wherein:

the image forming system comprises a detecting section for detecting a connection or disconnection of the printer with the scanner;

the printer and the scanner each comprise a user interface section composed of a display section and an operation section; and the image forming system further comprises a control section for controlling the respective user interface sections when the detecting section detects a connection of the printer with the scanner, such that display for the system can be performed entirely on either one of the user interfaces, and input for the system can be performed entirely on either one of the user interfaces.

22. An image forming system, including a first unit and a second unit, where one of the first unit and the second unit is operable to form an image on a recording medium, and the other of the first unit and the second unit is operable to optically read a document image, and further where the first unit and second unit are operable in combination in a systematic manner as a system, wherein:

the image forming system comprises a detecting section for detecting a connection or disconnection of the first unit with the second unit;

the first unit and the second unit each comprise a user interface section composed of a display section and an operation section; and the image forming system further comprises a control section for controlling the respective user interface sections when the detecting section detects a connection of the first unit with the second unit, such that display for the system can be performed entirely on either one of the user interfaces, and input for the system can be performed entirely on either one of the user interfaces.

* * * * *